United States Patent [19]
Schindler

[11] Patent Number: 4,638,433
[45] Date of Patent: Jan. 20, 1987

[54] MICROPROCESSOR CONTROLLED GARAGE DOOR OPERATOR

[75] Inventor: Wayne R. Schindler, Lisle, Ill.

[73] Assignee: Chamberlain Manufacturing Corporation, Elmhurst, Ill.

[21] Appl. No.: 615,339

[22] Filed: May 30, 1984

[51] Int. Cl.$^4$ .............. G06F 15/20; H02P 1/22; E05F 11/00; E05F 15/10

[52] U.S. Cl. .............. 364/400; 318/264; 318/265; 318/266; 160/189; 49/28

[58] Field of Search .............. 364/167, 400, 513; 318/262, 264, 265, 266, 282, 466, 467, 468; 340/696; 49/25, 28, 31; 160/189

[56] References Cited

U.S. PATENT DOCUMENTS

| | | | |
|---|---|---|---|
| Re. 29,525 | 1/1978 | Willmott | 325/37 |
| 2,883,182 | 4/1959 | Bornemann | 268/59 |
| 4,006,392 | 2/1977 | Catlett et al. | 318/266 |
| 4,037,201 | 7/1977 | Willmott | 340/167 R |
| 4,107,877 | 8/1978 | Lee | 49/28 |
| 4,119,896 | 10/1978 | Estes, III et al. | 318/266 |
| 4,263,536 | 4/1981 | Lee et al. | 318/266 |
| 4,289,995 | 9/1981 | Sorbev et al. | 318/262 |
| 4,328,540 | 5/1982 | Matsuoka et al. | 364/167 |
| 4,338,553 | 7/1982 | Scott, Jr. | 318/266 |
| 4,385,296 | 5/1983 | Tsubaki et al. | 49/25 |
| 4,393,342 | 7/1983 | Matsuoka, II | 318/266 |
| 4,401,929 | 8/1983 | Odaka et al. | 318/266 X |
| 4,475,069 | 10/1984 | Tadokoro et al. | 318/264 |
| 4,498,033 | 2/1985 | Aihara et al. | 318/265 |
| 4,529,920 | 7/1985 | Yoshida et al. | 318/466 |
| 4,538,661 | 9/1985 | Henry et al. | 160/189 X |
| 4,561,691 | 12/1985 | Kawai et al. | 49/28 |

Primary Examiner—Jerry Smith
Assistant Examiner—Jon D. Grossman
Attorney, Agent, or Firm—Hill, Van Santen, Steadman & Simpson

[57] ABSTRACT

A microprocessor controlled garage door operator which eliminates lower and upper limit switches on the garage door in that the upper and lower limits are set in a program mode of the microprocessor with up and down control switches by the operator. The settings of the door are stored in the memory of the microprocessor. The microprocessor also sets the force limits by establishing them slightly above the actual force required to move the door up and down and this prevents the forces to be set greater than required which could result in a dangerous condition. An external security switch is also connected to the microprocessor of the garage door operator to allow the door to be opened by those knowing the code. In program mode, the user enters in the 4 digit code and the 4 numbers are stored.

2 Claims, 9 Drawing Figures

MICROPROCESSOR CONTROLLED GARAGE DOOR OPERATOR

BACKGROUND OF THE INVENTION

1. Field of the Invention

This invention relates in general to garage door operators and in particular to a microprocessor controlled garage door operator.

2. Description of the Prior Art

Garage door operators of the prior art utilize upper limit and down limit switches which are actuated by movement of the door so as to set the up and down limits for the door. Prior art garage door operators also have force adjusting means so that the up and down force for the door can be adjusted by setting such force limit adjustment means. The up and down limit switches are set manually by the operator and the up and down force limits are set manually as, for example, by increasing the force limit by rotating a knob the first direction and decreasing the force limit by rotating a knob in a second direction.

Since the size of the door openings and the size of the door vary from installation to installation and since the weight of the door and setting of the springs require different force limits for different doors it has previously been necessary that the up and down limits and the force limits be set by the installer or the home owner when the garage door operator is installed. This leads to faulty installation in that the installers and home owners do not properly set the up and down limits and also they set the force limits too high or too low which results in a dangerous condition, particularly if a child or other object is caught under the door as it is moving down.

SUMMARY OF THE INVENTION

The present invention provides a microprocessor controlled garage door operator which includes a track and head unit mounted to the ceiling of the garage and which has a trolley connected to the door so as to move it up and down. A radio receiver is mounted in the head unit and is connected to the microprocessor unit and a control unit is mounted on the wall of the garage and is connected to the microprocessor. A security switch may be mounted to the outside of the garage and be connected to the microprocessor. The control unit and microprocessor may be put into a program mode in which condition the door may be moved downwardly with a down switch mounted on the control unit to the desired down position of the door and this position will be automatically set into the microprocessor memory. Then the door may be moved to the full up position with ar up switch which will set the up limit of the garage door in the microprocessor memory.

After the up and down limits have been set, the unit is placed out of the program mode and into the operate mode and the garage door is operated through a complete cycle which will automatically set the up and down force limits for the door. Subsequently, the door may be operated up and down with the up and down set limits and with the set force.

If for any reason the door does not properly operate, a door condition light will indicate that there may be something wrong with the operation of the control or the door. When this condition exists, the operator will be given a warning and can take proper correction action to remedy any such defects.

It is seen that the present invention comprises a microprocessor control garage door operator wherein the up and down limits and the forces set for the door are set in a manner such that they are stored in the memory of the microprocessor and the invention makes it impossible for the home owner to set the force limits too high which results in a dangerous condition. This is because the forces are automatically set for the particular installation in the microprocessor by measuring the actual forces needed to raise and lower the door and by setting the force limits slightly as, for example, 10% above these required forces. Thus, it is not possible for the home owner to set the forces to limits which are much greater than are necessary which can result in a dangerous situation.

Also, since the up and down limits are set by the home owner by noting and controlling the actual up and down positions of the door, these will be accurately set. This also prevents the down and upper limits from being set at points further than the door can actually move since the actual position of the door at the full down and full up position sets the up and down limits in the memory of the microprocessor.

A security switch may be utilized to allow the garage door operator to be actuated externally of the garage upon the use of the proper code. The attempt to open the garage door with the improper code will prevent the garage door operator from being actuated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
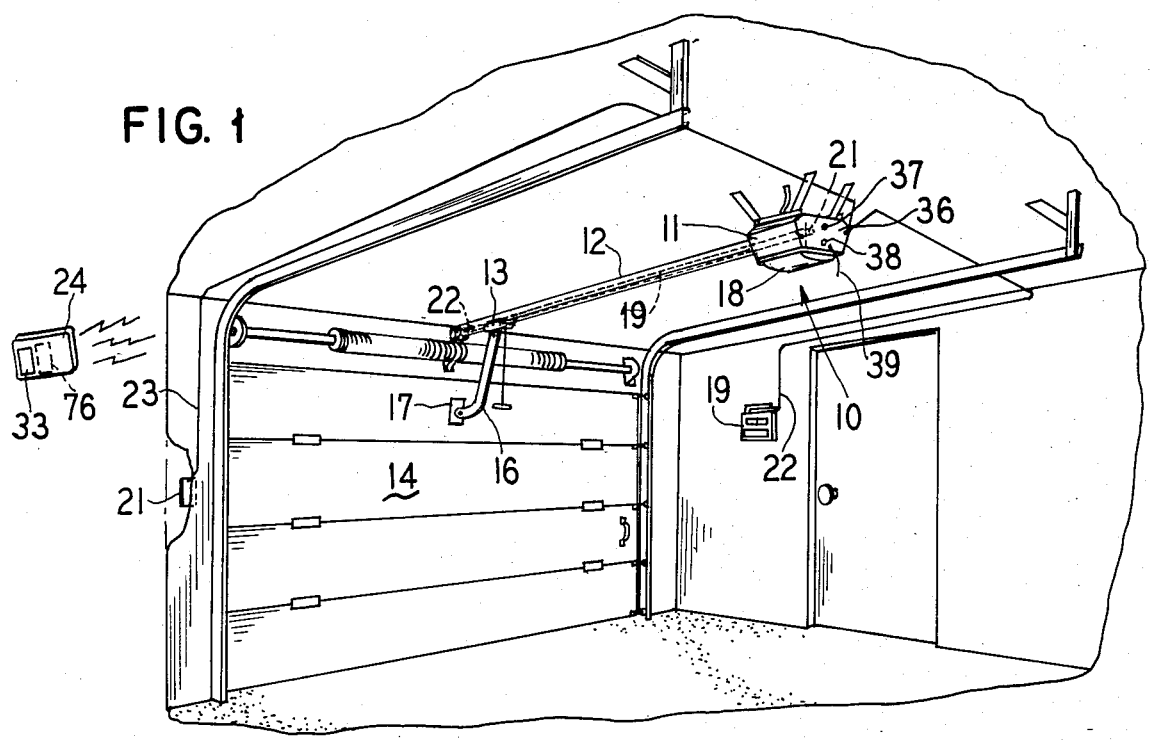
FIG. 1 illustrates the garage door operator of the invention installed to operate a garage door.
Figure 1A:
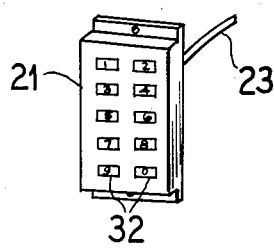
FIG. 1A illustrates the security switch.
Figure 1B:
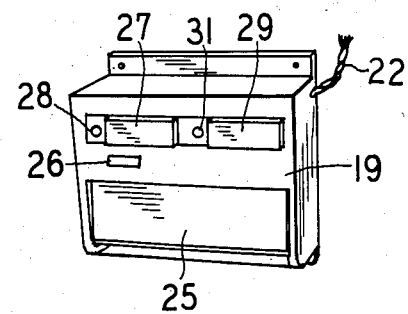
FIG. 1B illustrates the control unit.

FIG. 1 illustrates the garage door operator 10 of the invention installed to move a garage door 14 which is mounted on tracks in a conventional manner. The head unit 11 of the garage door operator 10 includes a motor which is mounted in the head unit 11 and has an output gear 21 that drives an endless chain 19 which also passes over a gear 22 mounted on the other end of the track 12. A trolley 13 is engageable with the chain 19 and moves on the rail 12 and has an arm 16 which is connected by bracket 17 to the door 14 so as to move it up and down. A light cover 18 is mounted to the head unit 11 and a control unit 19 is mounted on the inside wall of the garage and is connected by an electrical cable 22 to the microprocessor mounted in the head unit 18. A security switch 21 has a plurality of buttons which can be actuated in various sequences to provide a code for actuating the garage door operator 10 externally of the garage. It is connected to the garage door operator 10 by a cable 23. A transmitter 24 can be used to actuate the garage door operator 10 remotely and transmits a radio signal which is received by a receiver mounted in the head unit 11 to actuate the garage door operator.

The wall unit 19 has a control push button 25 for operating the door up and down and a control indicator light 26 which indicates when the garage door operator is being actuated. A vacation/down switch 27 is mounted on the control unit and indicator 28 indicates certain conditions when this switch is actuated. A work light/up switch 29 is mounted in the control unit 19 and an indicator 31 for this switch is also mounted in the control unit 19.

The security switch 21 is provided with a numbeer of switch actuators 32 which can be actuated in different sequences so as to provide a code to the microprocessor in the head unit 11 so as to actuate the garage door operator.

An energize switch 33 is provided for the transmitter 24 so as to remotely operate the garage door operator.

One surface 36 of the head unit 11 has a door condition indicator light 37 and a program/operate mode button 38 to allow the garage door operator to be set in the operate or/program mode. Antenna 39 of the radio receiver mounted in the head unit 11 extends from the head unit 10 as illustrated.

Figure 2:
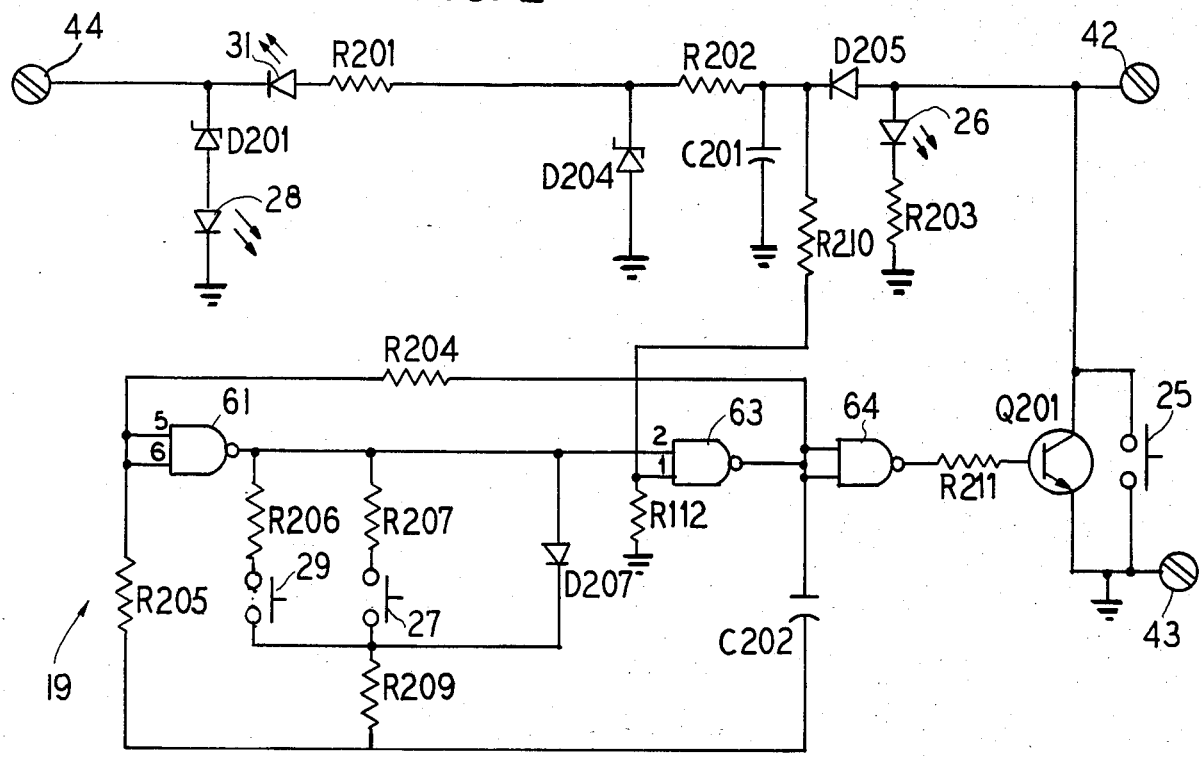
FIG. 2 is an electrical schematic of the control unit of the invention.

FIG. 2 illustrates the control unit 19 with the switches 25, 27 and 29 and the indicators 26, 28 and 31. A contact point 42 is connected to the collector of a transistor Q201 which has its emitter connected to ground and to a common terminal 43. The command switch 25 is connected in parallel with the collector-emitter of the transistor Q201. A terminal 44 is connected through the indicator 31 which may be a LED and through a resistor R201 which may be 470 ohms to a resistor R202 which may be 820 ohms and through a diode rectifier D205 to terminal 42. A Zener diode D201 and the indicator 28 which may be an LED is connected between terminal 44 and ground. A Zener diode D204 is connected between the junction point between resistors R201 and R202 and ground. A capacitor C201 which might be 10 microfrareds is connected between the junction point between the resistor R202 and diode 205 and ground. The indicator 26 which may be a LED is connected between terminal 42 and a resistor R203 which might be 1.2K ohms and ground.

An oscillator comprises a resistor R205 which may be 1.5M ohms which is connected to terminals 5 and 6 of an integrated circuit 61 which may be a type CMOS 4011 which has its output terminal connected to a resistor R206 which might be 180 k ohms and to switch 29. The other side of switch 29 is connected to a resistor R209 which might be 62.K ohms and has its other side connected to resistor R205. The switch 27 is connected from resistor R209 to a resistor R207 which may be 430K ohms which has its other side connected to the output of the circuit 61. A diode D207 is connected between resistor R209 and integrated circuit 61.

Integrated circuit 63 which may be a type CMOS 4011 receives at its number 2 input the output of the integrated circuit 61 and has its number 1 input connected to a resistor R112 which may be 91K ohms and which has its other side connected to ground. A resistor R210 which may be 100K ohms is connected between the resistor R112 and the resistor R202 as illustrated.

A capacitor C202 which may be 0.1 microfarad is connected between resistor R205 and the output of integrated circuit 63. An integrated circuit 64 which may be a type CMOS 4011 has its inputs connected to the output of integrated circuit 63 and its output connected to a resistor R211 which may be 3.9K ohms and which has its other side connected to the base of transistor Q201. A resistor R204 which may be 10M ohms is connected between the resistor R205 and the input to the integrated circuit 64 as illustrated.

Figure 3:
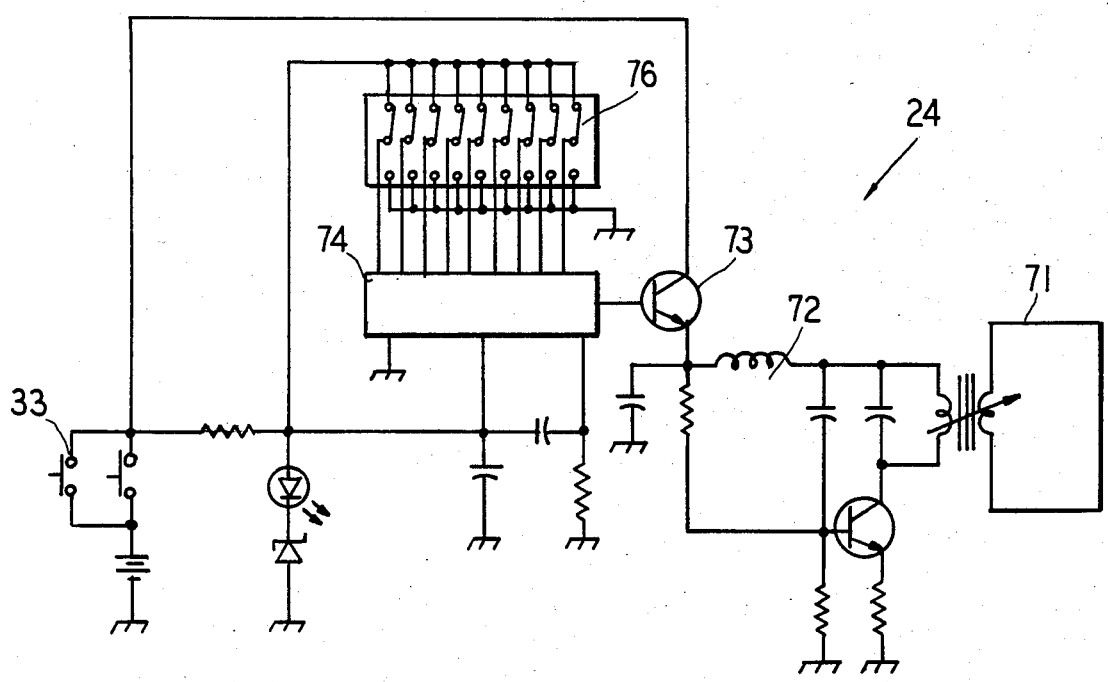
FIG. 3 is an electrical schematic of the transmitter of the invention.

FIG. 3 comprises the schematic of the transmitter which comprises an antenna 71 connected to an oscillator circuit 72 which is controlled by a transistor 73 and an integrated circuit 74. A code setting switch 76 is mounted in the transmitter and allows the selected code for the transmitter to be established by setting the switches 76 in different combinations. These switches can also be changed so as to vary the code in the transmitter. When the transmit switch 33 is depressed a coded signal is radiated by the transmitter 24 and the coded signal depends upon the setting of the switch 76.

Figure 4A:
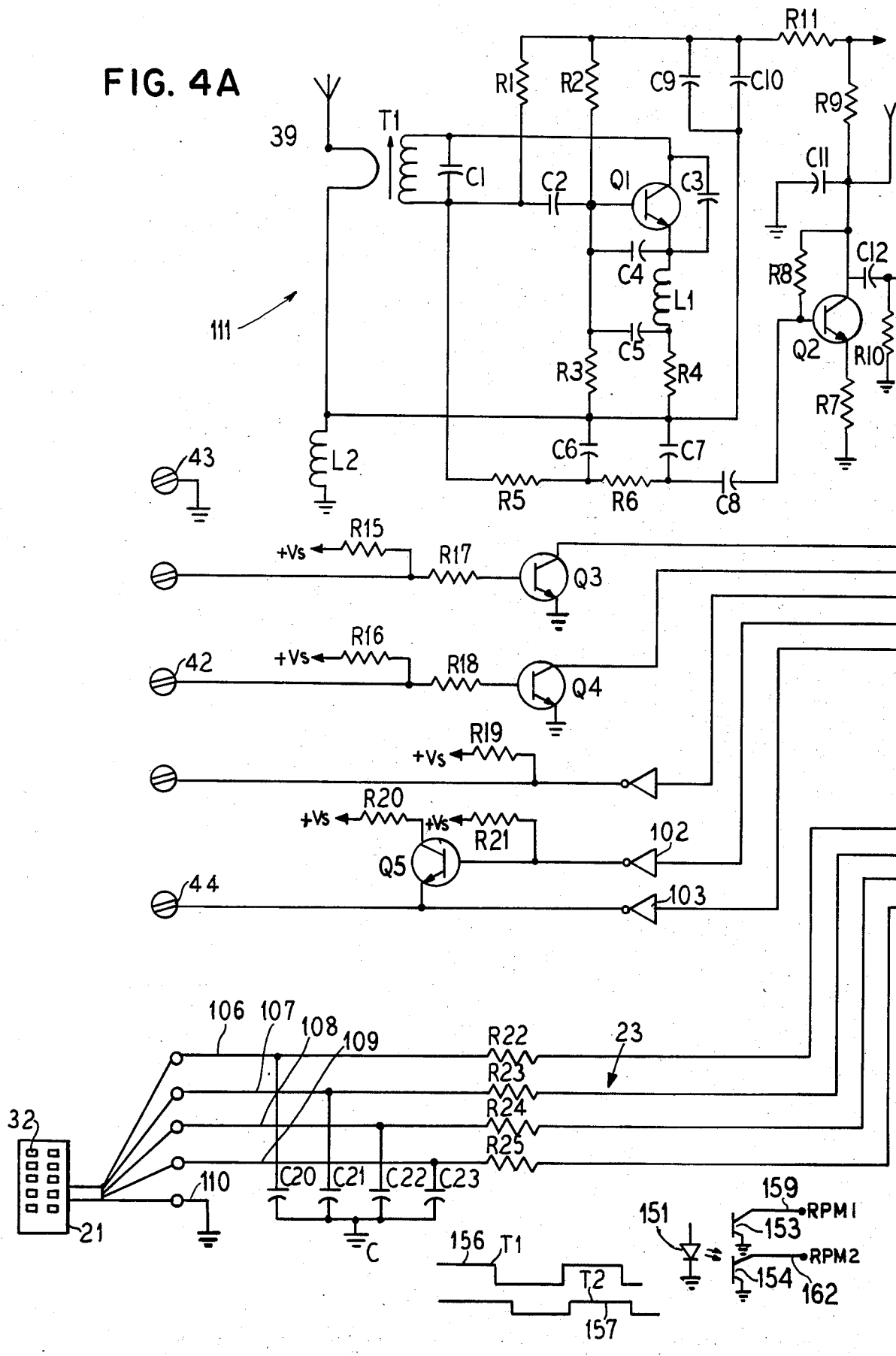
FIGS. 4A, 4B and 4C illustrate the electrical schematic of the garage door operation.
Figure 4B:
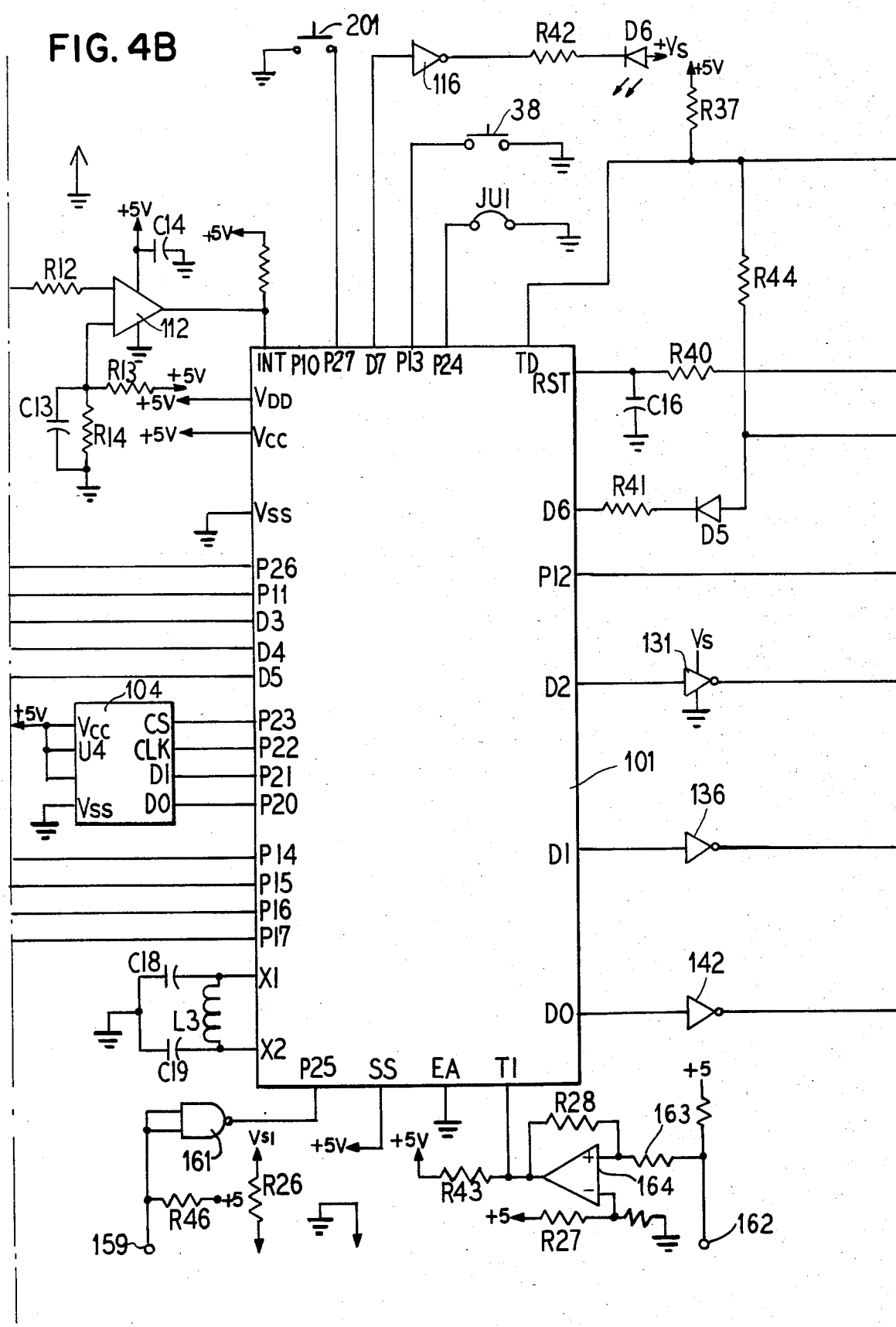
Figure 4C:
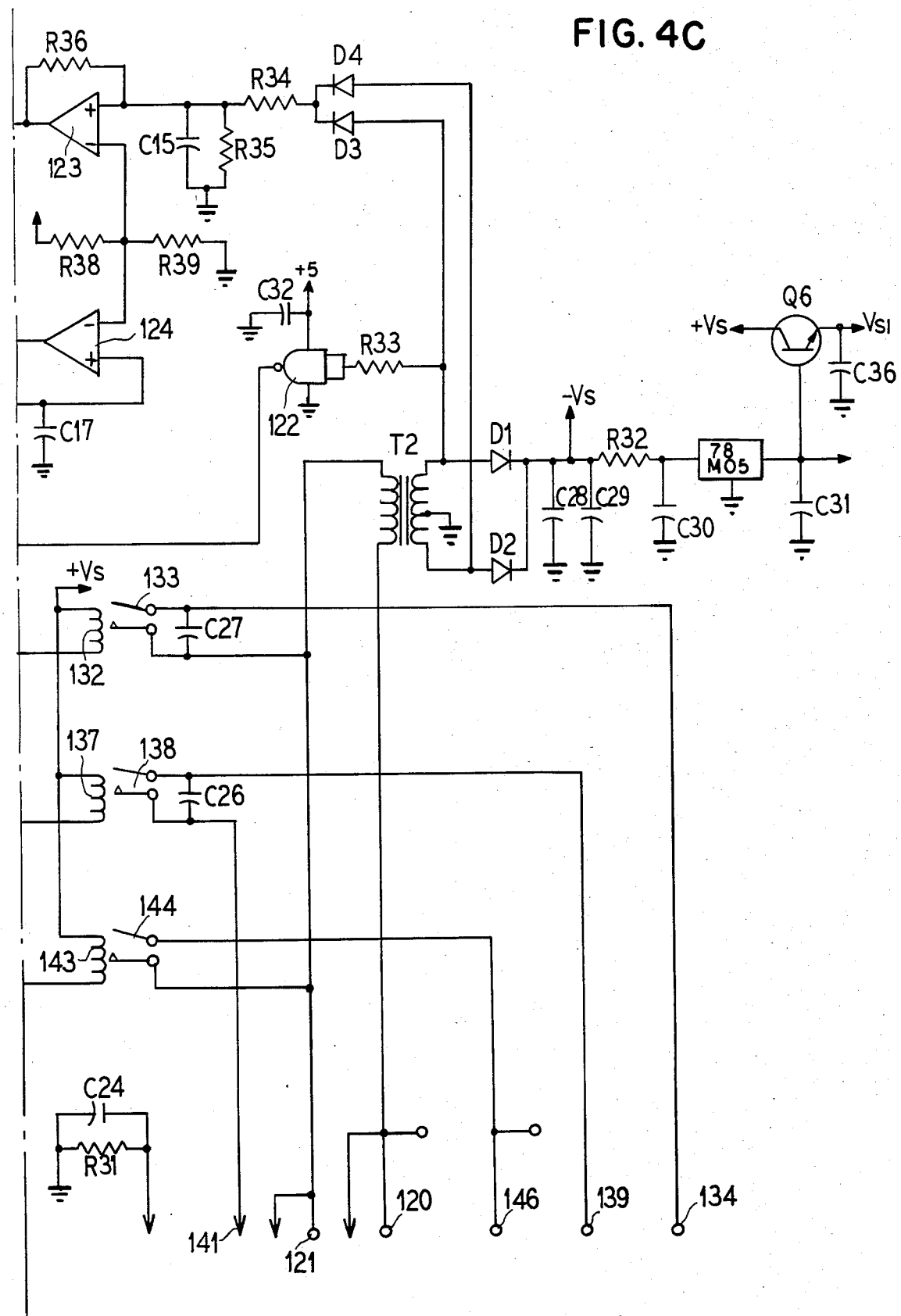

FIGS. 4A, B and C comprise an electrical schematic of the invention. A microprocessor 101 which might be, for example, an Intel type 8049 is connected to the terminals 42, 43 and 44 from the control unit 19 by cable 22. Terminal 43 is the common grounded terminal and pin $V_{ss}$ of the microprocessor 101 is connected to ground. Terminal 42 which is the command terminal is connected through a resistor R18 which might be a 100K and transistor Q4 to input terminal P11 of the microprocessor 101. Terminal 44 is connected through transistor Q5 and Darlington driver 102 which might be type ULQ2023A to terminal D4 of the microprocessor 101. Terminal 44 is also connected through Darlington driver 103 to terminal D5 of microprocessor 101. The EEROM 104 which might be a type XICOR 24431 has four output terminals which are connected respectively to terminals P20, P21, P22 and P23 of microprocessor 101.

The security switch 21 is connected to five input terminals 106 through 110 which are connected by cable 23 through resistors R22 through R25 to input terminals P14, P15, P16 and P17 of microprocessor 101. Terminal 110 is connected to ground. Capacitors C20, C21, C22 and C23 which might be 0.01 microfarad are connected between ground and terminals 106 through 109, respectively.

The radio frequency receiver 111 receives an input on the antenna 39 which is connected through the inductor L2 which might be 1 microhenry to ground, couples a signal through transformer T1 and parallel capacitor C1 which might be 3.9 picofarads to a capacitor C2 which might be 39 picofarads to the base of transistor Q1. The collector of transistor Q1 is connected through capacitor C3 which might be 1 picofarad to the emitter. A capacitor C4 which might be 3 picofarads is connected between the base and emitter transistor Q1. Inductor L1 which might be one microhenries is connected from the emitter of transistor Q1 to a resistor R4 which might be 8.2K ohms and which has its other side connected to the inductor L2. A resistor R3 which might be 7.5K ohms is connected between the base of transistor Q1 and the inductor L2. The output of the receiver 111 is supplied through capacitor C6 which might be 4.7 microfarads and transistor Q2 through capacitor C12 which might be 1 microfarad and resistor R12 which might be 100K ohms to a quad voltage comparator 112 which might be a type LM2901 and which has its output terminal connected to INT terminal of the microprocessor 101.

One inch obstruction switch 201 connects input P27 to ground when closed. It automatically sets the one inch reverse on hard obstruction. LED D6 is connected from a voltage source plus V5 through resistor R42 which might be 3.3K ohms to a Darlington driver 116 which might be a type ULQ2023A and which has its other side connected to terminal D7 of the microprocessor 101. The program switch 38 is connected between ground and terminal P13 of the microprocessor 101. A jumper JU1 is connected between ground and terminal P24 of microprocessor 101. 120 volt AC power is applied to terminals 120 and 121 and this is applied across the primary of transformer T2 which has its secondary grounded. Power is applied from one side of the secondary of the transformer T2 to the resistor R33 which may be 1 megohms, for example, to integrated circuit 122 which may be a type CD4011 and which has its output connected to terminal P12 of the microprocessor 101. A pair of diodes D3 and D4 are connected to opposite sides of the secondary of transformer T2 and have their other sides connected to resistor R34 which may be 1 megohm and which has its other side connected to circuit 123 which may be a quad voltage comparator type LM2901 which has its other side connected to terminal TP of the microprocessor 101. A capacitor C15 which might be 1 microfarad and a resistor R35 which might be 150K ohms are connected in parallel between the resistor R34 and ground. A circuit 124 which may be a quad voltage comparator LM2901 is connected to circuit 123 and has its output connected to resistor R40 which may be 1K ohm to the reset terminal of the microprocessor 101. Terminal D6 of the microprocessor 101 is connected to a resistor R41 which may be 1K ohms and through a diode D5 to an input to the circuit 124 and to a resistor R44 which may be 1 megohm which has its other side connected to circuit 123. A terminal D2 of the microprocessor 101 is connected through a Darlington driver 131 which might be a type ULQ2023A 131 to a down relay 132 which controls switch contacts 133 connected between power terminal 121 and the motor down terminal 134 such that when the relay 132 is energized the motor will run in the down direction. When the relay 132 is energized by output on terminal D2 of the microprocessor 101 contacts of switch 133 will be closed and power will be applied to the down direction rotation of the motor 136 to drive the garage door operator in the down direction. Terminal D1 of the microprocessor 101 is connected through Darlington driver 136 which might be a type ULQ20231A to relay 137 which controls switch 138 which applies power to the motor up terminal 139. The other side of the switch is connected to power input terminal 141. Thus, when the microprocessor 101 supplies output on terminal D1, relay 137 is energized which closes switch 138 to cause the motor 135 to run in the up direction to raise the door toward the up position.

Contact DO of the microprocessor 101 is connected through circuit 142 to a relay 143 which controls switch 144 which is connected to the work light on contact 146 to turn a work light 147 on.

Figure 5:
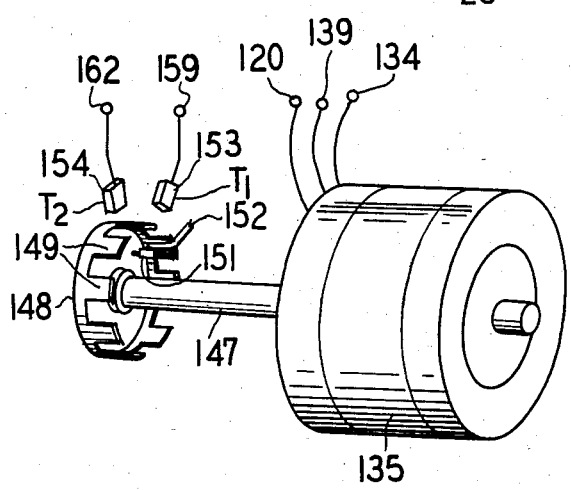
FIG. 5 illustrates the motor and speed control of the invention.

The motor 135 has an output shaft 147 which carries a cup-shaped shutter member 148 of generally cylindrical-shape and which has cut-out portions which form segments 149. A light source 151 is supported on a suitable bracket 152 so that it illuminates the inside of the shutter member 148 and a pair of light responsive diodes or detectors 153 and 154 are mounted so as to intercept the light as the shutter members 149 move out from between the light source 151 and the sensors 153 and 154. The light sensors 153 and 154 produce output pulse waves 156 and 157 which have a phase depending upon the direction of rotation of the shaft 147. In other words, if the shaft is turning in the clockwise direction relative to FIG. 5, the pulse wave 156 would lead pulse wave 157 but if the motor shaft 148 is turning in the opposite direction the pulse wave 157 would lead the pulse wave 156 and, thus, by sensing the outputs from the sensors 153 and 154 the direction of rotation of the output shaft 148 of the motor 135 can be detected. The sensor 153 is connected to input terminal 159 which supplies an input to terminal P25 of the microprocessor 101 through circuit 161 which might be a type CD4011. The sensor 154 supplies an input to terminal 162 which is supplied to input terminal T1 of microprocessor 101 through resistor 163 which may be 11K ohms and through circuit 164 which may be a quad voltage comparator LM2901 which has its output connected to terminal T1.

The up and down limits and the forces required are obtained by processing the RPM signals from the RPM signal on input 159 from sensor 153. Both of the RPM signals from sensors 153 and 154 are used to process the limit information. The force that the motor exerts is monitored from one second after the motor turn on until the motor is turned off. The force is determined by measuring the RPM low pulse width and if either of the limits are being programmed or if the force is being programmed an obstruction will only occur if the maximum force setting is exceeded. This will be indicated by the door condition indicator light 37 being illuminated. An obstruction will be indicated if the pulse width exceeds the pulse width that has been set during programming of the force. The door condition indicator is turned off by entering the program mode.

The maximum force is determined by the jumper on pin P24 with the jumper installed the maximum low pulse width allowed is established and with the jumper removed the maximum low pulse width allowed is 6.25 milliseconds, for example. It is to be noted that the photo interrupter shutter 148 or cup produces a square wave with a duty cycle of approximately 57% due to the voltage comparator inversion and this gives the longer time as being low at the microprocessor 101.

Only one low time that exceeds the preset force is needed to create an obstruction indication while in the operating mode. The RPM input is examined approximately every eighty milliseconds for the worse case. Since both the force and the trinary data decode routine utilize the hardware timer, the force is only examined during the blank time of the transmitter. The data decoding routine assures that if noise is detected on the data input, the blank routine is immediately executed and thus the force is measured.

The up force will be programmed whenever an internal up force flag is active and the down force will be programmed whenever an internal down force flag is active. These flags are set whenever the unit is put into the program mode by moving the program switch 38 whenever the limits are changed with the work light switch or the vacation switch 27 or 29. These flags will only be reset when the respective limit is hit. This ultimately means that if the user places the unit into the program mode and then back into the operating mode on the next cycle of the door the forces will be programmed. During programming the forces, the transmitter will be disabled and this will allow every RPM pulse width signal to be examined.

The limits are kept by counting the number of falling edges on the input from the sensor 153. Since the limits could be effected by noise, the program only counts falling edges while the motor is on and for ten seconds after the motor turns off. Noise at any other time will not effect the limit information.

The two RPM signals from sensors 153 and 154 are needed so as to increment or decrement the limits properly by examination of the second RPM signal upon the falling edge of signal T1. The door direction can be positively determined and there are two situations where the door direction cannot be assumed. The first is for door backup at the down limit due to excessive door pressure. The second is during a "soft" door reversal. During a soft reversal (no hard obstruction) while the door is still coasting down, the up relay is pulled in. It may take 0 to 4 RPM counts until the motor can overcome the doors momentum and actually start to move up. These falling RPM edges must be counted in the proper direction.

The door direction is obtained for one second after motor startup and for 10 seconds after motor turnoff. After the motor turns off, the door direction is obtained by a hardware interrupt on the T1 input for 1½ seconds by hardware interrupt and for 8½ seconds by examining the T1 and P25 inputs. During the 1½ second immediately following the motor turn off, the transmitter is disabled due to door direction routine exclusively using the microprocessors hardware timer. Immediately following the motor turn off, the RPM comes in very quickly, and polling may not read the terminal P25 input quickly enough to properly obtain the door direction information.

The receiver is input to the microprocessor on the external interrupt input pin and the first falling edge in a code frame will be the sync pulse. The sync pulse is timed out and stored. Subsequent data bits will be 1, 2 or 3 times the sync pulse width. Only sync pulse widths of ½ milliseconds to 2 milliseconds are accepted. Anything else will be considered to be noise and decoding will be aborted by going into a blank time-out.

During the blank time the interrupt input is polled. After bit ten of a code is determined, a blank flag is set. Every loop of the main program will poll the interrupt input. If the input is ever low this flag will be reset. After the blank timer times out this flag is examined. If high, then the blank time is considered good. If low, then the blank time is considered bad. The next code to come in will be considered invalid.

In the control unit 19, the three switches and three lights are arranged so that the three switches and the command LED 26 are multiplexed over the command wire 42. The command LED 26 will be on as long as power on this contact is high. The command switch 25 shorts out the power supply to the control unit. The microprocessor will detect a constant low and interpret this as a command switch closure. The vacation switch 27 and the work light switch 29 when closed generate a low frequency low duty cycle wave form. The microprocessor will determine the frequency of oscillation to determine the switch that is closed. Particular frequencies were chosen to allow the AC line frequency to time out the switch closure.

The two indicators 31 and 28 are controlled by one wire. A high will cause the vacation light 28 to be on. A low will cause the work light 31 to be on and a floating circuit will cause both lights 28 and 31 to be off. If both functions are to be on by closing both switches 27 and 29, the microprocessor will oscillate between the two lights at a rate of 8.33 milliseconds and this will give the appearance that both lights 28 and 31 are continuously on.

Power up and down is accomplished by two hardware signals. Advanced power fail is applied to terminal TO of the microprocessor and the reset terminal. Power up will have the advance power fail input going high followed by the reset going high. Reset going high allows the microprocessor to start executing instructions. The circuit is configured to allow approximately 5 cycles of AC power to dropout without affecting either the off or reset.

Power down begins by the advanced power fail signal going low. The circuit is constructed to allow small AC line drops without effecting either the APF or the reset signals. The amount of time is very dependent on the AC line amplitude just before dropout. The microprocessor will detect this and store the 16 interval RAM buffers into the EEROM 104. The microprocessor will then cause the hardware reset by pulling I/O port D6 low. The circuit is configured so that either the microprocessor will reset itself or the APF being low long enough will reset the microprocessor.

MICROPROCESSOR THEORY OF OPERATION: SOFTWARE

1. Initialization
2. Power Down
3. Timers
4. Motor Operation
5. Motor and Light Relay Subroutines
6. Door Limits of Travel and Direction of Travel
7. Force Routine
8. Control Case
   A. Command, work and vacation switches
   B. Work and Vacation Leds
9. Program Mode Switch
10. Auxiliary Obstruction
11. Receiver Decoding
12. EEROM Information Storage and Retrieval
13. Keyboard
14. RAM Organization and Flag Definitions
15. Timer Definitions NOTES:
A. All labels that are in the software document will be references in this paper by putting a colon after the word, i.e., the label start will appear as start:
B. All numbers are decimal unless followed by an H for hexidecimal.
C. A dash preceding a flag or a signal name indicates that it is active low.

1. INITIALIZATION

The initialization routine begins at INITL: The I/O ports are set for their proper outputs. The flags 1 register is saved and the registers from 32H to 73H are zeroed except for the upper byte of the keyboard timer (register 4EH) which is loaded with an FFH. The RAM locations from 24H to 31H are checked against the CHECKSUM register at location 20H. If the numbers do not match, then the EEROM is read and its CHECKSUM is compared to its own registers. If the EEROM CHECKSUM is no good, the limits and CLC register pairs are set to FFFFH and the limits unknown flag is set. This will prevent the motor from operating until the unit is programmed. If the EEROM'S CHECKSUM matches the calculated CHECKSUM, this information is used to operate the GDO.

If the numbers match then an erroneous hardware reset occurred (A glitch?) and the RAM will be assumed to be good. The flags1 register is restored. An erroneous hardware reset may not have been preceded by the power down routine and thus the information that is in the EEROM may not match the information that is in the RAM.

2. POWER DOWN

The power down routine is located at STR:. At this point, the advanced power fail signal (APF) is polled. If the APF is active then it is debounced for 60 USEC. If the debounce fails then the program continues as if nothing ever happened. If the APF remains active then all relays are turned off along with the door condition indicator to minimize the current drain on the power supply capacitor. The flags1 register is stored into Sflags1 and the registers from 20H to 31H are stored into the EEROM chip. After storage, a delay of 10 MSEC occurs to allow the EEROM to complete the storage operation. The software finishes by resetting I/O pin D6 low to cause a hardware reset of the chip.

3. TIMERS

Almost all timing over 10 MECS is timed out from the A/C line frequency. The section of code that runs these timers starts at label start. The signal into pin P12 is a 16.6 MSEC square wave generated from secondary side of the transformer. The timer routine will begin by comparing the P12 input with the RTC flag (real time clock). If they match then the timer routine is skipped. If not, the RTC flag is inverted in order to match the present P12 input and the timer routine proceeds. Execution of the timer routine begins by reinitializing the input ports of port 2.

The timers are located sequentially in RAM. This is to allow RO to always be able to point to the next timer by a mere increment. Subroutines byteo (one byte) or bytet (two bytes) are used to see if a timer is active or not and, if active, increments the timer. Notice that a timer starts at a negative number and times out upon incrementing to zero. These subroutines will also signal the calling routine if the timer has timed out.

The timer routine will check each timer one at a time. There are 13 timers, 3 of them are 2 byte timers. Also, timers TIM30, T1M1, and Tkeys are dual function timers. That is, depending on the state of things. The timers are used for different purposes, i.e., upon the timeout of the TKY timer, The T/-F flag is checked to see if it was a five or ten second timer.

The timer functions are listed in the section fifteen of this paper. The timers will be discussed in context of the appropriate function, i.e., the 4.5 minute timer will be discussed with the light turn on routines.

4. MOTOR OPERATION

The routine that controls the motor is located at main and main is executed if the SYSC flag is active. The motor routine begins by disabling the force routine and data interrupts so as to allow all status to be checked without changing any flags halfway through the status checkout. Along with disabling interrupts, the RPM fail timer (TIMRPM) is turned off.

Exiting the main routine can occur in two ways via the MAC:or MAC2: Labels. Execution of MAC: will result in the execution of MAC2: MAC:will activate a hardware interrupt in order to get the proper door direction. See section six. MAC2 deactivates the CHCKPT register and the SYSC flag.

The CHCKPT register is a double check of the SYSC

See the SYSC subroutine. Both the SYSC bit and the CHCKPT register must be set properly in order to activate the motor. This was done so that an erroneous setting of the SYSC bit (A glitch?) would not start the motor. The SYSC flag and the CHCKPT register are reset at the end of the motor routine. It is desirable to have both of them as close as possible to prevent a hardware reset glitch from deactivating one and not the other.

Upon going into the main routine, the motor is checked to see if it is going up or down. If it is going up, under all conditions, the motor is turned off. If the motor is going down and either the down limit is active (set by the limits routine) or the GDO is in program mode, the motor is turned off. Otherwise there has either been an obstruction or a command and the door must be reversed.

A reversal in the proceeds as follows. The reverse timer is enabled (T1MREV) for one-half second and the motor is turned off. Upon timeout (at TREV.), If the up limit is active nothing more happens. If the up limit is not active then the auto reverse flag is activated and the SYSC: routine is executed. This will eventually allow the motor routine to start the motor up.

Upon going into the main routine, if the motor is off, the light is activated to start the four and one-half minute timer. If the unit is in operate mode, the limits unknown flag is checked. If active then the motor is turned off (redundancy) and the routine is exited. The status is checked for the auto REV flag, down limit flag, and auxiliary obstruction flag being active. If any one of these are active then the motor is activated in the up direction as long as the up limit flag is not active.

Operation of the motor routine in program mode is as follows. If the door is going up or down the motor is turned off. If the motor is already off then program control is directed to INPRG1. At INPRG1 the limit flags are set according to the PUP/-PDWN Flag. The CCSW register is checked for either the vacation or worklight switch depression if the worklight switch is active the motor down relay is turned on. If the vacation switch is active the up motor relay is turned on. If neither switch is active the motor off subroutine is executed.

5. MOTOR RELAY AND LIGHT RELAY SUBROUTINES

The motor subroutines (MOTOF:, MOTDWN:, and MOTUP:) are only called from the main routine. The light subroutines (LGHTON: and LGHTOF:) may be called from several spots in the program.

There are several pieces of code that are common to all five routines. Each routine starts out by disabling all interrupts and selecting RAM register bank one. The motor up and motor down routines will preceed this by checking the CHCKPT register and the RAM CHECKSUM to see if both are good. If not the motor will not be activated and the routine simply returns.

All five routines will finish by using the same piece of code. This last piece of code starts at CHT1:. All routines will have found the zero crossing of the A/C line voltage, loaded register 3 with the I/O information that is to be output to the DBUS port, and loaded the hardware timer with a number to allow the proper delay from the zero crossing of the line voltage to allow the particular relay to turn on at the proper time. After the timer times out, the bus information is output to the DBUS I/O port.

The subroutine that finds the zero crossing of the A/C line voltage is called tick. The tick: routine will remain in a loop until the real time clock input changes state. During this time the edge routine is continuously executed so as not to miss any edges coming in on the RPM input.

The up and down motor routines are also responsible for activating the one second and 42 second timers. The motor off routine reactivates the 42 second and one second timers as ten second and one and one-half second timers. Notice that the only way that the timer routines know if the timer is from the motor on routines or from the motor off routine is by reading the I/O port. If the motor is off then the timers must be the ten second and one and one-half second.

The light on routine activates the four and one-half minute timer. If the work light flag is inactive then the light is turned off otherwise the light is left on.

6. DOOR LIMITS OF TRAVEL AND DIRECTION OF TRAVEL

Detection of a change in the RPM input (T1) is detected by the edge: subroutine. The edge: subroutine debounces the RPM input and sets or resets the LRI flag (last RPM input) accordingly. A falling edge on the input will cause the CTRPM register to be incremented. It is the limits routine that will pick up the CTRPM register to increment or decrement either the CLC or limits register pair.

There are several circumstances where the direction of door travel cannot be assumed. That is, the door itself must be monitored for the proper direction. There are two clear cases of this problem. First is backup of the door at the down limit due to excessive door pressure. The second case is during a "SOFT" door reversal (no hard obstruction), even though the up relay is actuated, the door momentum may still take the door down until the motor has had enough time to counter act the door force.

The GETDR: subroutine will determine the door direction by detecting the phase relationship of the phototransistors on the RPM board. GETDR is executed in two ways, by hardware interrupt or by being polled from the edge subroutine. Upon motor turn on or turn off the STDR: subroutine is executed and enables a hardware interrupt on the RPM input. Upon motor turn on the direction is obtained by interrupt for one second. Upon motor turn off the direction is gotten by interrupt for one and one-half seconds and by polling from the edge: Subroutine for another eight and one-half seconds. The interrupt method is used when the motor speed is fast. In order to guarantee that the second phototransistor is in the proper state after the falling edge of T1 (note that this is the edge used to increment the CTRPM register for the limits routine), the other RPM input (P25) must be read very quickly in order to determine correctly the direction of travel. The problem with using the interrupt method is that data from the receiver data cannot be decoded at this time since the hardware timer must be used for both the data decode and the RPM interrupt. Thus, data decoding is disabled for one and one-half seconds after motor turn off. For the remainder of the eight and one-half seconds the GETDR subroutine will be polled since the motor is going very slow. This will allow the data decoding to take place.

When the GETDR: is executed via interrupts, the routine exits by loading the blank timer with a minus one. It is the blank timer routine that will execute the STDR: subroutine to reenable interrupts again to execute the GETDR subroutine. This will insure that on every next falling edge of the RPM signal the door direction flag, U/-D, will be set correctly.

Counting the RPM falling edges and managing the current limit counter (CLC) and the limits registers is done by the routine starting at MBYE. The CLC maintains the current position of the door. The limits register pairs remember what the total length of door travel is.

The limit routine starts by testing if the forty-two/ten second timer is active. If it is not active the CTRPM register is cleared and the limits routine is skipped. If it is active, the CTRPM register is examined. If the CTRPM is zero the limits routine is again skipped. Otherwise the count in CTRPM is used to adjust either the CLC or the limits register pair depending if the unit is in operate or program mode.

Assuming that the unit is in operate mode, the CTRPM count must be added or subtracted from the CLC. This determination is made from the U/-D flag that is set by the GETDR subroutine. If the door is going down, the CTRPM count is subtracted from the CLC. The down limit is hit by the CLC decrementing below zero. When the down limit is hit, the down limit flag is set, the open door indicator is turned off, the program force down flag (PFD) is reset and the SYSC subroutine is executed to allow the main routine to turn the motor off. The situation is similar with the up limit. When the U/-D flag is set, the CTRPM count is added to the CLC register. The up limit is hit when the CLC increments over the limits register count. When the up limit is hit the up limit flag is activated, the program force up (PFU) flag is reset, and the SYSC subroutine is executed to allow the main routine to turn the motor off.

The limit program is such to allow the user to program the limits of door travel easily. The program can determine if the limits being programmed are "good" limits or not. A "good" limit is when the number in the limits register pair is between −80 (FFB0H) and 2303 (08FFH). 2303 counts represents a door travel of over twelve feet. If this count is exceeded (notice that an underflow will also look like a count that is too high) then the CLC and limits registers are automatically set to FFFFH and the limits unknown flag is activated. The −80 count is used to allow coast to accumulate when the registers are set to FFFFH.

The limit that is being programmed is indicated by the PUP/-PDWN flag in the flags1 register. This flag is set or reset while in program mode, in the motor routine, whenever the command switch is actuated. The control case LED routine located at tiled: (time LED) also uses this flag in program mode to flash the proper LED to indicate which limit being programmed. The work light LED indicates the up limit and the vacation LED indicates the down limit. The respective switches will also run the door in the indicated direction. The work light switch moves the door up and the vacation switch moves the door down. These switches will only move the door while they are depressed. Releasing them will cause the motor to stop. Pressing the command switch will change the PUP/-PDWN flag and thus changes the limit to be programmed.

Briefly programming the limits via the work light switch or the vacation switch is as follows.

---

Programming the up limit
Moving up CTRPM Count+CLC→CLC and limits registers
coast—CLC−CLC+CTRPM Count
Moving DWN CLC-CTRPM Count→CLC and limits registers
coast—Limits−Limits−CTRPM Count
Programming the Down Limit
1. Limits−Limits−CLC
2. CLC=0

| | |
|---|---|
| Moving Up | Limits−Limits−CTRPM Count |
| | Coast—Limits−Limits−CTRPM |
| Moving Down | Limits−Limits+CTRPM Count |
| | Coast—CLC−CLC+CTRPM Count |

---

The above chart is relatively self explanatory. The coast refers to when either the vacation or the work light switch is let go and the motor turns off and coasts to a halt. If the door is coasting the same direction as the indicated limit (Up limit and coasting up) then the limits register will be frozen and the coast added to the CLC. It is assumed that the coast in the programming of the limits will be the same as the coast when the door is runs in operate mode. If the door is going the opposite direction of the indicated limit (programming up limit and going down) the coast will be subtracted from the limits registers in order to further reduce the length of door travel.

During programming of the limits, whenever the limits number is changed a new CHECKSUM number is calculated and stored.

The 1″ obstruction set switch will decrease the down limit every time it is depressed. This allows for automatic adjustment for the 1″ obstruction test required by U.L.

Every time this switch is pressed a count of 12 is added to the CLC and the limits register pairs. This will effectively lower the down limit by ⅜″. Also 12 will be added to the tweak register located at 30H in the RAM. If the door is installed properly, the down force will be programmed from the up limit to when the door just touches the floor. After setting the 1″ reversal via the 1″ obstruction switch, the door will push harder into the floor. If the forces ever need to be relearned, then the down force should be learned from the up limit until the door just touches the floor. During reprogramming of the down force, the forces are examined until the door is within this registers count of the down limit. At this time the force from here on out will not be considered for permanent storage.

7. FORCE ROUTINE

The force routine has three modes. Operate mode, program force mode and programming the limits mode.

In the operate mode the force routine is run from one second after the motor is turned on until the motor is turned off again. The force routine must share the hardware timer with the data decode routine. This means that the force is only run during the blank time of the receiver. The force is measured by interrupting on a falling edge of the RPM1 input. Loading the hardware timer with number that was preset during the program force routine, interrupting from that timeout and looking again at the RPM input. If the input is high then the RPM frequency is faster then the timer and the force is ok. If the RPM input is low the RPM frequency is longer than the timer. The force has exceeded the programmed in value. Upon determination of an obstruction, the SYSC subroutine is executed and the motor routine will determine the proper motor action to be taken. This method of two hardware interrupts provides for a very accurate count of the RPM input signals low time.

The blank timer routine (TBLNK) enables the force routine by setting the edge/-timer (E/-T) flag. Activating the DO force flag (DOFCE), and enabling the hardware timer to interrupt on the next falling edge of the RPM signal. Upon the interrupt, the RPM routine will determine that the E/-T flag is set for edge. The flag will be reset and the RPM input will be debounced to determine if a noise spike caused the interrupt. If the signal is high, the routine exits. Otherwise, if the GDO is in operate mode, the proper force is loaded into the hardware timer and the timer is enabled as a timer. Upon timer overflow another interrupt will occur. The E/-T flag will be low so that the RPM input will be checked. If the RPM input is low, then the RPM signal's frequency is longer than the timer which indicates there is excessive force. The routine will execute the SYSC subroutine to signal an obstruction. If the RPM input is high then the RPM signal's frequency is faster than the timer and there is no obstruction detected.

If the GDO is programming the limits, an interrupt on the RPM edge will cause the hardware timer to be loaded with the maximum force. During programming of the limits, the force is not known so the unit is allowed to go to maximum force. There are two values for maximum force and the value used is determined by a hardware jumper on P24. When the timer overflows and causes an interrupt, the RPM input is checked. If the signal is low, then the force is too high and the SYSC subroutine is executed and the DCI will be turned on.

If the GDO is programming the force, an interrupt from the RPM edge will cause the timer to be loaded with the minimum force setting (approximately 4 MSEC). Upon the timer overflow interrupt occuring the low time is timed out. The actual time that is obtained is increased slightly to account for door changes, weather, etc. This force number is compared to the force number that is already stored. The heaviest count stays in the register as the force to be used during operate mode.

The up and down forces are programmed independent of each other. The force for a particular direction is to be programmed whenever its program force flag is active (PFU for up and PDF for down). The flags are activated whenever the unit is put into program mode or whenever either limit is adjusted via the work light or vacation switches. The program force flags are reset whenever the particular limit is hit. That is—after programming the limits, a command is given and the door runs from the up limit to the down limit. Upon hitting the down limit the PFD flag is reset.

There is an RPM fail timer (TIMRPM) that is used to detect if the RPM signal has stopped coming in altogether. Notice that the force routine just described will not be executed if the RPM input maintains itself at a DC level. TIMRPM is initialized for one-half second when the one second motor start timer (TIM1) times out. Every time the force routine times out the RPM low time (E/-T flag reset at the timer interrupt) then TIMRPM is reinitialized for another one-half second. If this timer ever times out, then the force routine has not been run in a half-second and thus a hardware failure has occurred. This will start the TIMDCI timer to blink the DCI LED to indicate to the user that a failure in the GDO head has occurred.

8. CONTROL CASE

A. COMMAND, WORK, AND VACATION SWITCHES

The control case has several features that are served by a total of three wires. Ground, command, and the indicator wire is all that is needed to control three switches and three LEDS. This routine starts at EMAIN:.

The three switches are multiplexed over the command wire. Power to the control case also comes from this wire. If there is no key depression the command line will be high to the control case and low into Pll of the microprocessor. The software has written refering to the voltage level with respect to the control case and not the microprocessor input pin. All references will be made accordingly. If the command switch is pressed, the CC input is constantly low. The work light and vacation switches will generate a low frequency, low duty cycle waveform. The timing is approximately 10 MSECS low and 50 MSECS high for the vacation switch and 10 MSECS low and 25 MSECS high for the work light. The frequency was chosen in order to use the A/C line frequency to time out the switch depression. The vacation switch should take between five and eight counts of the A/C line. The work light will be between two and four. The low duty cycle was chosen because power to the control case comes from the command line and the oscillator circuit will only last a short time if power is removed. The low time was chosen according to the nyquist criteria for sampling a waveform. This input is polled.

Each key depression is debounced. The command switch is debounced after sixteen to twenty four milliseconds of being constantly low. The vacation and work light switches are debounced by getting four time-outs in a row of the same period. Thus the vacation switch will take 4*(10 MSEC+50 MSECS) or 240 MSECS to activate. All switches are debounced off by the command timer timing out. This will take approximately one-hundred milliseconds.

A key depression will start the control case timer (TIMCC) to start at negative nine. As long as the control case input is low, TIMCC continues to increment. Assuming that the command switch was pressed, eventually TIMCC increments three times. The switch routine detects this and turns off the TIMCC (sets it to zero) and executes the SYSC. Subroutine so that the motor routine will turn the motor on or off. Further holding down of the command switch will only keep the command flag in the CCSW register active.

If the key that was depressed was either the vacation or the work light the switch routines must detect the frequency of oscillation, debounce the switch, and activate the proper flags for other routines to examiner.

The frequency of oscillation is determined by examining the TIMCC timer at each falling edge of the control case signal as long as there are no active switches, a falling edge will activate the TIMCC to negative nine. TIMCC is incremented by the A/C line timer routine (at TCCT). Upon the next falling edge of the control case signal, TIMCC is examined for its content. A count of negative seven to negative five indicates the work light switch is pressed. A count of negative four to negative one indicates that the vacation switch has been pressed. Any other numbers will cause TIMCC to be reinitialized and the routine exited. After four consecutive time outs of the same period, the switch is considered debounced.

If the unit is in operate mode, then pressing the work light switch will flip the work light bit in the CCSW register and flip the incandesent lights on or off. If the vacation switch is pressed then the vacation bit in the CCSW register is flipped.

If the unit is in program mode and the motor is off, then pressing either the work light switch or the vacation switch will result in the flag in the CCSW register being set and the SYSC: subroutine being executed to start the motor in the proper direction.

Debouncing off the work light or vacation switch while in the program mode will result in the SYSC. Subroutine being executed in order to turn the motor off. Also the command, work light, and vacation flags in the CCSW are reset.

B. WORK AND VACATION LEDS

The routine that controls the control case LEDS is located at tiled. When in operate mode the CCSW register is examined to see if either the work light or vacation switches are active. If only one switch is active then the appropriate LED is turned on. Both switches being active means that both LEDS should be on. With only one wire to the control case this is not possible. What is possible is to alternately turn on each LED at a rate of 8.33 MSECS. this way both LEDS will look on.

If the unit is in program mode then either the vacation or work light LED is to BLINK at a rate of three times every two secons. If the PUP/-PDWN flag in the flagsl register is set then the work light LED is activated otherwise the vacation LED blinks.

9. PROGRAM MODE SWITCH

Both the program mode and the 1" obstruction switches are momentary switches. The debounce routine is started at DBYE. This routine will check if the motor is on. If it is then the routine is skipped. If the motor is off then the switch inputs are polled to see if either one has changed state. If one has the new depressions are stored into the SW register and the debounce timer (TIMDCI) is started for 24–32 MSEC timeout.

The code at TSWDEB. times out the debounce timer and determines which switch changed state. If the 1" obstruction set switch changed the program determines if the switch is being pressed. If it is then the tweak register, the CLC registers, and the limits registers are incremented by a count of 12. If the switch is not being pressed then the routine exits.

If the program switch is active then the vacation and work flags in the CCSW register are reset. If the unit is going into operate mode the routine exits. If the unit is going into program mode the routine jumps to GO-PROG. At GOPROG. the up or down limit flags are set according to the PUP/-PDWN flag, the PFD and PFU flags are set, the up and down forces are set to minimum and the D.C.I is turned off.

10. AUXILIARY OBSTRUCTION

This routine is located at KBYE: and sets the AUX OBS flag in the flagsl register to signal to the motor routine that an auxiliary obstruction is occuring. A low signal of eight to sixteen milliseconds will set the AUX OBS flag. The same time is used to debounce the auxiliary obstruction off.

Activation of this flag while the motor is going down will result in the SYSC subroutine being called to activate a motor reversal. See TAUXOB:routine in the A/C line timer routine. If the motor is off and the AUX OBS flag is active then the motor routine will not allow the door to go down.Commands will only allow the motor to go up until the up limit is reached.

11. RECEIVER DECODING

Data decoding is split into two routines. The interrupt routines will decode one code and signal to the housekeeping routine if the code was valid or invalid via the flags3 register. One code consists of one blank time followed by ten data bits. each bit can be one, two, or three times the length of the SYNC pulse. The sync pulse is the first bit to be transmitted after the blank time.

Data is not decoded one second after motor start up, one and one half seconds after the motor is turned off, during programming of the limits, and during programming of the force. In the first case, motor turn on, data is not decoded because of the RF dead spot effect. In both the motor turn on and turn off cases, the direction flag for the limits routine must be set properly by execution of the GETDR:subroutine via interrupts. Data decoding and GETDR: cannot be done simultaneously.

During programming of the force and programming of the limits the limits the transmitter is disabled only while the motor is on. During programming of the force, the data is not decoded in order to allow the force routine to find the longest RPM pulse width by looking at as many pulse widths as possible. There is no data decoding while programming the limits just happened to workout that way and there is not a good reason to add code to circumvent the situation.

The data code housekeeping routine is located at CHBITS. Four valid codes are needed to actuate a command. The valid code counter keeps incrementing on each valid code flag. If three invalid codes come in a row, the valid code counter is reset. As soon a four valid codes come in, if the unit is in operate mode, the SYSC subroutine is executed. If the unit is in program mode, the data stored in the TRIDT locations (56H to 58H) are stored into the TRIDAT locations (29H to 2BH) and the work light is flipped on or off. The transmitter is considered active as long as there is one valid code separated by no more than six invalid codes.

The program has been set up to easily add decoding for auxiliary codes. If an auxiliary output is desired, after four valid codes are acknowledged, the tenth bit or the channel bit will be in register 59H. The value can be zero, one or two.

The trinary data bits are stored in the TRIDAT locations (29H to 2BH). The TRIDT locations are only used as buffers during programming the data bits in (locations 56H-58H). The bits are stored in a compacted manner. The first location of TRIDAT, 29H, contains bits one, two, and three. Each data bit needs two bits to remember its value since there are one, two, and three millisecond pulse widths. The DATAIN register will assemble incoming bits. When three bits are in, the interrupt routine will compare it with the appropriate switch register, i.e. a typical bit pattern will look like this—SW1, SW2, SW3, 00. For a code of SW1=1MSEC, SW2=2MSEC and SW3=3MSEC→00, 01, 10, 00 or just 00011000. Notice that the last two bits contain no information.

Data decoding is done through hardware interrupts on the -INT PIN and interrupts by the hardware timer. The description that follows is the decoding for the SYNC pulse and the first data bit. The other bits are decoded by the same method.

To start decoding the blank timer (TBLNK routine) enables the interrupt pin. The timer routine also loads the blank timer for a timeout in sixteen to twenty-five milliseconds. Upon timeout, the blank timer will assume that a sync pulse and ten data bits have come in. Also the blank timer routine will activate the -SYNC find bit in flags4.

The first falling edge that occurs on the interrupt pin will be decoded as the SYNC pulse. The blank timer is restarted for a 8.33 to 16.66 millisecond timeout. The bit pointer, data pointer, and datain registers are initialized and the SYNC pulse is timed out in a software delay loop. The delay loop uses the hardware timer to accumulate the time. The timer increments every ninety-six microseconds. A SYNC pulse is only valid if it is between one-half and two milliseconds or a timer count between five and twenty-one. Any value other than that will cause the bit valid flag to be reset.

After a valid SYNC pulse is detected, the timer count is stored in the SYNC register for use in the decoding of the subsequent data bits. The INT pin is enabled and the interrupt routine is exited.

The next interrupt should be the first data bit. The blank timer is restarted again for 8.33 to 16.66 MSEC timeout. The SYNC register contents is gotten, two is added to it, and this value is loaded into the hardware timer. The timer is set to interrupt upon overflow. One hundred and ninety two microseconds was added to the sync pulse time to decode a data bit in order to compensate for pulse stretching and to give more of a window to decode data bits.

The next interrupt will occur from the hardware timer. The interrupt input pin is read. If it is still low then the datain register is incremented and tested to see if this bit has exceeded a three times sync pulse width. If it has, the bit valid flag is reset and decoding of this code frame halts. If it is still less than three times the sync pulse, the hardware timer is restarted again for the sync pulse time plus zero.

If the interrupt input pin is high when the hardware timer interrupt occurs, the datain register is shifted left twice. This will effectively saves this bit time. The bit pointer is incremented to see if three bits are in. If not, as in the case of the first data bit, interrupts are enable on the interrupt pin and the routine exits. If three bits are in then the bit pointer is reinitialized to negative three and the datain register is compared to wherever the data pointer is pointing to. If the data does not match then the bit valid flag is reset. Either way, data pointer is incremented to point to the next register and the datain register is cleared in order to assemble and compare the next three data bits that are to come in.

The only deviation that will occur from the above sequence is if the data is to be programmed in or if the code is at bit ten.

When programming in a new transmitter code, the first code to come in (determined by the valid counter equal to zero) is stored in the TRIDT locations (56H to 58H). Subsequent codes are compared to the first one. After four valid codes are found the housekeeping program will store the TRIDT locations into the TRIDAT locations. This method assures the microprocessor of storing only a valid transmission when in program mode.

Bit ten in a code sequence is very similar to program mode. Only the first valid code input will store bit ten. Subsequent codes will compare their bit ten to the stored bit ten for validity. Bit ten is stored in register 59H. This will allow future reprogramming of the microprocessor to enable auxiliary codes using the channel bit. using the channel bit.

The code assembling routine ends when bit ten is detected. That is, upon getting bit ten the bit valid flag is checked. If it is set, then the last code was good and the valid code bit flag is set. If the bit valid flag is reset then this bit is set again in order to decode the next code sequence and the invalid code flag is set. The valid code and invalid code flags are used by the housekeeping routine to increment the valid and invalid code counters. The blank timer is restarted to timeout in less than 8.33 MSEC so that the force routine can be enabled if necessary. Finally the blank time detect flag is reset. A blank time is valid only if this flag is not set before the blank timer times out.

12. EEROM INFORMATION STORAGE AND RETRIEVAL

The EEROM routines read and write registers 20H to 31H to and from RAM. Three RAM registers are used to aid in keeping the subroutines general. These are the EAINST, WORDPT, and eACT registers. The EAINST register has the instruction that is to be output to the EEROM. The WORDPT register holds the address of the microprocessor RAM location that is to be written into or read out of the EACT contains the number of register pairs plus two to be written or read.

Both the EEROM read routine (at EADAIN) and the EEROM write routine (at IWRITE) begin by outputting the appropriate instruction to the EEROM chip. The data is then clocked in or out. Upon completion, the data write routine simply returns to the calling routine. The data read routine will check the information from the EEROM chip to see if it is good or not. This is done by a CHECKSUM on locations 24H to 31H. If the information is good then SFLAGS1 is put into the Flags1 location and the CCSW register is stored into SCCSW location. If the CHECKSUM that is calculated does not match the CHECKSUM that was read then the CLC and the limits register pairs are set to FFFFH and the limits unknown flag is activated.

13. KEYBOARD

The keyboard routine allows the user to have a four digit code to actuate door motion. This code is set when the unit is in program mode by depressing the desired four key combination. The keyboard also acts as a panic switch when the door is in motion. If the door is moving, then the keyboard routine needs to see only one switch closure to execute the SYSC subroutine. This effectively will act like a door obstruction.

The keyboard routine has three timers associated with it. One timer is used to debounce the key depressions for twenty-five to thirty-two milliseconds. The other two timers use the same RAM locations (TKY). Obviously only one can be running at any given point in time. The active timer is identified by the ten/-five flag (T/-F). The ten second timer is started upon the first key depression. If three more keys are not entered within ten seconds, the flags and registers that are associated with the keyboard are reinitialized. The five second timer is used as a keyboard lockout timer to frustrate anyone that would try to activate the door through trial and error of keying in code combinations. As soon as a bad key entry is made, the keyboard is ignored for five seconds. Anybody trying to guess the code would have no indication that the board was not being read and thus there is a very good chance that when keying in the proper code the previous bad code entry has got the keyboard disabled. The panic switch feature is still operational even if the keyboard is locked out.

14. RAM ORGANIZATION AND FLAG DEFINITIONS

RAM register bank one is always used for interrupt routines and for the motor and light turn on and turn off subroutines.

RAM locations 20H to 31H are used as the buffer to the EEROM. This information has a CHECKSUM on it located at register 20H. The CHECKSUM merely sums locations 24H to 31H, adds one to the sum and stores it. The one was added just in case the RAM ever comes up all zeroes. The sum of all zeroes would equal the CHECKSUM in that case.

The A/C line timers are located in sequential order to allow the timer routine to always access the next timer by incrementing the register pointer.

The register definitions are as follows.

| LOCATION | LOCATION NAME | DESCRIPTION |
| --- | --- | --- |
| 20H | CHSUM | Summation of locations 24H to 2FH |
| 21H | SFLAGS1 | Storage buffer for the flags1 register |
| 22H | CLC | Two bytes that stores the current position of the door |
| 24H | LIMITS | Two bytes that stores the length of door travel |
| 26H | UPFCE | Storage of force number for the up direction |
| 27H | DNFCE | Storage of force number for the down direction |
| 28H | SCCSW | Storage for the CCSW register |
| 29H | TRIDAT | Three bytes to store the trinary transmitter code |
| 2CH | KEYS | Four bytes to store the keyboard code |
| 36H | BUSS | Storage of DBUS information for the motor and light subroutines |
| 38H | CHCKPT | Double check of the SYSC flag |
| 3EH | PDU | Program down/up—contains the PFD and PFU flags |
| 3FH | FLAGS4 | Contains flags Dir, E/-T,NBT, BLNKS DOFCE, and -SYNC find flags |
| 40H | TIM45 | Four and one-half minute timer |
| 42H | TIM42 | Fourty-two second timer |
| 44H | TIM1 | One second timer |
| 45H | TIMRPM | RPM fail timer |
| 46H | TIMREV | Reverse timer—One-Half second |
| 47H | SWDB | Program switch debounce timer |
| 48H | TIMCC | Control case switch timer |
| 49H | TIMAUX | Auxillary obstruction timer |
| 4AH | TBLK | Blank timer—Used for blank time of transmitter |
| 4BH | TIMKEY | Debounce timer for the keyboard |

| | | |
|---|---|---|
| 4CH | TKY | Five or ten second timer for the keyboard routine |
| 30H | TWEAK | Storage for the 1" obstruction switch information |
| 4FH | TIMLED | Control case LED timer |
| 50H | FLAGS1 | Contains limits unknown, PUP/-PDWN, AUX OBS, SYS CMND, DN Limit and Up limit flags |
| 51H | FLAGS2 | Contains auto Rev, KPROC, RTC T/-F, and LRI flags |
| 52H | FLAGS3 | Contains CERR, CVALID, and BIT valid flags |
| 53H | CODECT | Trinary code counters—upper nibble is the error counter and the lower nibble is the valid code counter |
| 54H | DATAPT | Points to one of seven trinary code registers |
| 55H | BITPT | Counter to count when three trinary data bits have been assembled in the DATAIN register |
| 56H | TRIDT | Three byte buffer used to store the trinary code during programming |
| 59H | — | One byte buffer to store the tenth trinary bit |
| 5AH | CCINP | Control case input—flags used to input a control case switch closure before debounce is done. Also, contains the SACT flag |
| 5BH | CCSW | Control case switches—flags which control switches are active and contains and -LIMITCT flag |
| 5CH | CCDEB | Counter to debounce the vacation and work light switches |
| 5FH | DATAIN | Buffer to assemble three trinary data bits |
| 60H | SYNC | Storage of trinary data sync pulse count |
| 65H | CTRPM | Counter of RPM falling edges |
| 67H | KEYPT | Points to keyboard storage buffer |
| 68H | KEYIN | Keyboard input port buffer |
| 69H | SW | Program mode and 1" obstruction switch storage |
| 6AH | SWF | Program mode and 1" obstruction switch debounce storage. |
| 6EH | EAINST | EEROM instruction buffer |
| 6FH | WORDPT | Points to location in RAM to be input to or output from the EEROM |
| 70H | EACT | Counter that has the number of register pairs plus two to be output |
| 73H | TIMDCI | Timer for the DCI LED |

RAM FLAG DEFINITIONS
dash preceding the name indicates that the flag is active low

| NAME | DESCRIPTION |
|---|---|
| F0 | F0 Flag—indicates that the unit is in program mode |
| F1 | F1 Flag—used by the trinary decode timer interrupt routine to indicate bit ten being decoded |
| PFU | Program force up. When active indicates that the up force is to be programmed |
| PFD | Program force down. Indicates that the Down force is to be programmed. |
| DIR | Direction—Indicates that the door direction routine is to be executed via interrupts |
| -NBT | No blank time—reset when the interrupt input is polled and determined to be low |
| BLNK | Blank—used to time out blank time from the end of bit ten of a data code input |
| DOFCE | DO Force—indicates to the timer interrupt routine that the interrupt is for the force routine |
| -SYNC FIND | Manipulated by the blank timer routine to signal to the data edge interrupt routine that the next pulse is a sync pulse |
| LIMITS UNKNOWN | Set when the limits of door travel is not known. Used to disable the motor. |
| PUP/-PDWN | Remembers direction of door travel. Used in program mode to determine the limit being programmed |
| U/-D | Up or down—Indicates the direction the door is traveling. Set or reset in the GETDR subroutine |
| AUX OBS | Set if the auxiliary obstruction input is active |
| SYS CMND | Set by the SYSC subroutine to activate the motor routine |
| DN LIM | Down limit flag—set when the CLC decrements below zero. Reset by the one second timer timeout |
| UP LIM | Up limit flag—set when the CLC increments above the limits register count. Reset by the one second timer timeout |
| AUTO REV | Automatic reverse—set by the reverse timer timing out. Signals motor routine that the door is reversing. |
| KPROC | Key processed—Active when the key in the KEYIN register has been processed |
| RTC | Real time clock—used to determine if the RTC input has changed state |
| T/-F | Ten or five second timer—set or reset when the TKY timer is activated |
| LRI | Last RPM input—Reflects the state of the RPM input. If different then the edge routine sets or resets this flag and increments the CTRPM register if the flag is low |
| CERR | Code error—trinary interrupt routine sets this flag to signal to the housekeeping routine that an invalid transmission has been received |
| CVALID | Code valid—trinary interrupt routine sets this flag to signal to the housekeeping routine that a valid code has been received |
| BIT VALID | Flag examined at the end of a code transmission to determine if all the bits plus the blank time were valid |
| SACT | Switch active—Used for the control case switches |
| WRKLGHT | Temporary storage to debounce the work light switch |
| SEC | Security—Old name for the vacation switch same as WRKLGHT but for vacation |
| -CMNDSW | Command switch—temporary storage to debounce the command switch |
| WRKUP | Work/up switch—In operate mode this flag latches a work light switch depression. In program mode the flag signals that the switch is being pressed. |
| SECDWN | Security/down switch—same as WRKUP |
| CMND | Command—active as long as the command switch is held down |

15. TIMER DEFINITIONS

The four and one-half minute timer is started by the Lighton: subroutine. Upon time out the light is turned off and the flag F0 (program mode flag) is reset to indicate operate mode. This will prevent the user from forgetting to take the unit out of program mode.

The forty-two second timer is a dual timer. The motor up or motor down routines start the timer for forty-two seconds. If a limit is not hit then this will signal a command to the motor routine. Upon motor turn off, this timer is turned on again for another ten seconds. The limit routine will only count RPM input while this timer is active. The purpose of this is to prevent noise glitches from changing the limits while the unit is off.

The one second timer is also a dual purpose timer. Upon motor turn on, this timer prevents the error code counter or the valid code counter from incrementing. Effectively, this turns the data decoding off to prevent spurious operation due to RF dead spots. Also, the one second timeout will reset the limit flags and turn on the open door indicator. The second function is activated at motor turn off. The timer is activated for one and one-half seconds. This signals to the blank timer routine to enable the GETDR: subroutine via interrupts in order to count RPM input in the proper direction.

The reverse timer is activated by the motor routine in order to reverse the door. If the door is going down and a command is given then the motor is turned off for one-half second and the up motor relay is activated.

The switch debounce timer is a twenty-four to thirty-two millisecond timer used to debounce the program switch and the 1" obstruction switch. Time out results in the respective switch code being executed.

The control case timer is a sixteen to twenty-four millisecond timer used to debounce the command switch when the switch is activated. The timer is also used to determine the frequency of oscillation when either the vacation or work light switch is pressed. This timer is also used to debounce any of the three switches off. The debounce off time is one-hundred milliseconds.

The Auxiliary obstruction timer is a 8.33 to 16.66 millisecond timer used to debounce the auxiliary obstruction input.

The blank timer is used to time out between the transmitter blank time so that the force routine may be executed. This timer is nominally set for twenty-five to thirty-two milliseconds. There are other factors that can set or reset this timer. Execution of the GETDR: subroutine via interrupts always finishes by setting the blank timer to negative one (less than eight milliseconds). The data decoding routine will also set this timer to time out in eight to sixteen milliseconds on every falling edge that interrupts the processor.

The keyboard debounce timer is used to debounce the keyboard entries for twenty-four to thirty-two milliseconds.

The keyboard timer is a dual function timer, either five or ten seconds. See section 13 of this report.

The control case LED timer is used to turn on or off the LEDS. During program mode either the vacation or the work light LED is flashing at a rate of twice per two seconds. While in operate mode, if both the work light and vacation functions are active, then both LEDS are to be on. To make them appear on to the user each LED is flashed on and off alternately every 8.33 milliseconds.

The DC1 time, when activated, will blink the DC1 LED at a rate of 3 times a second. The only way to disable this timer is to give the microprocessor a hardware reset.

After the garage door opener has been installed, it is placed in the program mode by moving the switch 38 to the program position. By checking the control unit 19 and determining which of the lights 28 or 31 are on, it can be determined whether the system is set for setting or up or down limit. If the light 28 is flashing, the switch 27 can be closed to cause the door to move down until the desired down limit of travel has been reached. When the door has been moved by the motor 135 to the desired down position the switch 27 is opened. Switch 25 is pressed to allow the up limit to be adjusted. Then the up limit can be set by closing the work light switch 29 which will cause the motor 135 to drive the door in the up position and it will continue to drive the door until the full up position is reached at which time the switch 29 should be released and the up limit will have been set. In the event the door moves past the desired up limit, it can be moved backward by closing switch 27 to the proper position.

When the up and down limits have been set, press momentarily switch 38 to place the machine in the operate mode. Then the press switch 25 which will cause the door to close if it has been in the full open position. After it is closed, then push the switch 25 againto cause the door to move to the full open position. During this sequence, of one complete cycle after the up and down limits have been set the force limits will be automatically set by the microprocessor. The forces are automatically set at a force of approximately 10% above that required to move the door in the up and down positions and these cannot be changed by the operator to cause the limits to be set at a dangerous and unsafe force.

Thus, the open and closed forces are set automatically and the garage door opener is ready for a normal operation if the force is to be reset at a later time you would press and release the program/operate mode switch 38 to enter the program mode. Press and release again to return to the operate mode. Press the wall control unit switch button to run the door through a full cycle and the force will automatically be reset.

In the event the door will not operate when programming limits or force check the door condition indicator light on the back panel of the garage door operator which is the light 37. If this light is continuously on, the garage door may not be operating properly as for example the spring force may be too high and it may be necessary to disconnect trolley and move the garage door up and down manually. If this light is flashing it indicates that the garage door opener has a fault.

The one inch obstruction switch 201 when depressed lowers the down limit a fixed amount as for example, ⅜ inch.

Although the invention has been described with respect to preferred embodiments, it is not to be so limited as changes and modifications can be made which are within the full intended scope of the invention as defined by the appended claims.

The following is the program.

```
;   CHAMBERLAIN MFG          *    ENGINEERING SPECIFICATIONS
;   CORPORATION                   ------------------------------
;   845 LARCH AVE                 SOFTWARE FOR MICROPROCESSOR
;   ELMHURST, ILL 60126           GARAGE DOOR OPENER
;
;---------------------------------------------------------------
;
;   ECN #   DATE    BY      APPROVED            REVISIONS
;                                            SPEC NO. 19GA0183
;
;---------------------------------------------------------------
;
;
;
;
;
;
;
;
;
;
;---------------------------------------------------------------

NAME ('GDOSP')

TITLE GDO SPECIFICATIONS--MICROPROCESSOR

;COPYRIGHT DUCHOSSOIS 1984

KEYOPT  SET     -1              ;KEYBOARD OPTION  0-INACTIVE
                                ;                -1-ACTIVE
GF      SET     -1              ;GF=-1 THEN GDOF.MAC USED
                                ;GF=0  THEN GDOZE.MAC USED

; Now lets get on with the fun!!

IF GF

TIMRPM  EQU     04CH            ;RPM FAIL TIMER

TRC     EQU     045H            ;RECEIVER ON/OFF TIMER

ELSE
```

```
;------------------------------------------------
; CHAMBERLAIN MFG         ENGINEERING SPECIFICATIONS
; CORPORATION             ------------------------
; 845 LARCH AVE           SOFTWARE FOR MICROPROCESSOR
; ELMHURST, ILL 60126     GARAGE DOOR OPENER
;------------------------------------------------
; ECN # DATE   BY   APPROVED       REVISIONS
;                                  SPEC NO. 190A0188
;------------------------------------------------

;------------------------------------------------

NAME ('GDOSP')

TITLE GDO SPECIFICATIONS--MICROPROCESSOR

;COPYRIGHT DUCHOSSOIS 1984

KEYOPT  SET   -1          ;KEYBOARD OPTION. 0=INACTIVE
                          ;                -1=ACTIVE

GF      SET   -1          ;GF=-1 THEN GDOF.MAC USED
                          ;GF=0  THEN GDO2E.MAC USED

; Now lets get on with the fun!!

IF GF

TIMRPM  EQU   04CH        ;RPM FAIL TIMER
```

```
        TRC     EQU     045H            ;RECEIVER ON/OFF TIMER

ELSE

TIMRPM  EQU     045H            ;RPM FAIL TIMER

TRC     EQU     04CH            ;RECEIVER ON/OFF TIMER

ENDIF

CHSUM   EQU     020H            ;CHECKSUM FOR EAROM REGISTERS

SFLAG1  EQU     021H            ;STORAGE FOR FLAGS1

CLC     EQU     022H            ;CURRENT LIMIT COUNT

LIMITS  EQU     024H

UPFCE   EQU     026H            ;UP FORCE NUMBER

DNFCE   EQU     027H            ;DOWN FORCE NUMBER

SCCSW   EQU     028H            ;STORAGE FOR CCSW REGISTER

TRIDAT  EQU     029H            ;TRINARY DATA STORAGE

KEYS    EQU     02CH            ;KEYBOARD DATA STORAGE

TWEAK   EQU     030H            ;TWEAK-STORAGE OF AMOUNT THAT DOWN LIMIT
                                        ;IS DECREASED

BUSS    EQU     036H            ;BUS TEMPORARY STORAGE

EQU     038H            ;CHECK POINTS BEFORE ACTUATING MOTOR

03EH            ;PROGRAM DWN/UP FORCE

03FH            ;FLAGS4

TIM45   EQU     040H            ;4.5 MINUTE TIMER

TIM42   EQU     042H            ;42 SEC OR 10 SEC TIMER

TIM1    EQU     044H            ;ONE SEC TIMER

TIMREV  EQU     046H            ;MOTOR REVERSE TIME DELAY

SWDB    EQU     047H            ;SWITCH DEBOUNCE TIMER

TIMCC   EQU     048H            ;CONTR CASE TIMER
```

```
TIMAUX   EQU   049H      ;AUXILLARY OBSTRUCTION DEBOUNCE TIMER

TBLK     EQU   04AH      ;TRINARY DATA BLANK TIMER

TIMKEY   EQU   04BH      ;KEYBOARD DEBOUNCE TIMER

TKY      EQU   04DH      ;TEN&FIVE SEC KEYBOARD TIMER

TIMLED   EQU   04FH      ;CONTROL CASE LED TIMER

FLAGS1   EQU   050H

FLAGS2   EQU   051H

FLAGS3   EQU   052H

CODECT   EQU   053H      ;TRINARY CODE ERROR AND VALID COUNTERS

DATAPT   EQU   054H      ;TRINARY DATA POINTER

BITPT    EQU   055H      ;TRINARY BIT POINTER

TRIDT    EQU   056H      ;TEMP TRINARY DATA (PROGRAM MODE)

CCINP    EQU   05AH      ;CC INPUT-NOT YET DEBOUNCED

CCSW     EQU   05BH      ;CC DEBOUNCED ACTIVE SWITCHES

CCDEB    EQU   05CH      ;CC DEBOUNCE TIMER

DATAIN   EQU   05FH      ;TRINARY DATA INPUT BUFFER

SYNC     EQU   060H      ;TRINARY SYNC PULSE COUNT

BCT      EQU   061H      ;BLANK COUNTER

CTRPM    EQU   065H      ;TEMP RPM COUNTER

KEYPT    EQU   067H      ;KEY POINTER (PTS TO KEY1,2,3,OR 4)

KEYIN    EQU   068H      ;UNDEBOUNCED KEY INPUT

SW       EQU   069H      ;PROGRAM AND 1" SET SWITCH DEBOUNCE

SWF      EQU   06AH      ;PROGRAM AND 1" SET SWITCH FINAL VALUES

EAINST   EQU   06EH      ;EAROM INST BUFFER

WORDPT   EQU   06FH      ;EAROM REG POINTER(ADDR)

EACT     EQU   070H      ;WORD COUNTER

TIMDCI   EQU   073H      ;DOOR CONDITION INDICATOR LED TIMER

WRT1     EQU   093H      ;EAROM WRITE REG 1 INST (1AAAAIII)
```

```
WRT7    EQU    0C3H        ;EAROM WRITE REG 7 INST (ADDR=ADDR+1)

WRT8    EQU    0C8H        ;EEROM WRITE INSTRUCTION FOR 8 WORDS

READ8   EQU    0CEH        ;EEROM READ INST FOR 8 WORDS

WREN    EQU    0F4H        ;EAROM WRITE ENABLE

WRDS    EQU    0F0H        ;EAROM WRITE DISABLE

STO     EQU    0F1H        ;EAROM STORE INST

RCL     EQU    0F5H        ;EAROM RECALL INST

SLEEP   EQU    0F2H        ;EAROM SLEEP INST

SBIT0   EQU    1           ;SET BIT 0

SBIT1   EQU    2

SBIT2   EQU    4

SBIT3   EQU    8

SBIT4   EQU    16

SBIT5   EQU    32

SBIT6   EQU    64

SBIT7   EQU    128
;
;
RBIT0   EQU    0FEH        ;RESET BIT 0

RBIT1   EQU    0FDH

RBIT2   EQU    0FBH

RBIT3   EQU    0F7H

RBIT4   EQU    0EFH

RBIT5   EQU    0DFH

RBIT6   EQU    0BFH

RBIT7   EQU    07FH

MINFCE  EQU    0E0H        ;MIN FORCE

MAXFCE  EQU    0C4H        ;MAX FORCE=APPROXIMATELY 190LBS
```

```
FGDMFC  EQU     0D0H            ;FIBER GLASS DOOR MAX FORCE=
                                ;APPROXIMATELY 150LBS ON A
                                ;ONE HALF HORSE POWER MOTOR.

IF GF

.LIST

INCLD   FDS1:GDOF.MAC

ELSE

INCLD   FDS1.GDO2E.MAC

ENDIF

END

NAME('INT')

TITLE EXTERNAL AND TIMER INTERRUPT ROUTINE

;COPYRIGHT DUCHOSSOIS 1984

.LIST

ORG 0

JMP INITL

ORG 3                       ;EXTERNAL INTERRUPT (DATA)

SEL RB1

MOV R7,A                ;STORE ACC

JMP EXTI

ORG 7

;PUT TIMER INTERRUPT ROUTINE HERE
```

```
SEL RB1

MOV R7,A            ;SAVE ACC

STOP TCNT

MOV R1,#FLAGS4

MOV A,@R1

JB3 RPM             ;DO FORCE ROUTINE? YES

JB7 GETDIR          ;NO. DO GET DIRECTION ROUTINE? YES

MOV R1,#DATAIN      ;NO

JNI DLOW            ;DATA INPUT STILL LOW? YES.

MOV R0,#DATAPT      ;NO

MOV A,@R1           ;ROTATE DATIN OVER BY TWO

RL A

RL A                ;MOVE SWITCH OVER TWO

MOV @R1,A           ;STORE DATAIN

MOV A,@R0           ;GET BITPT

XRL A,#TRIDT+3      ;POINTING AT SW10

CLR F1              ;REG? (DATAPT NOT=SW10)

CPL F1              ;DATAPT=SW10

JZ DPROG            ;DATAPT=SW10? YES

CLR F1              ;NO. CLEAR FLAG 1

INC R0              ;POINT TO BITPT

INC @R0             ;INC BITPT

MOV A,@R0           ;CHECK IF THREE BITS ARE IN

JNZ ENEXT           ;DATAIN REG. NO.

MOV @R0,#(256-3)    ;YES. COUNT THREE BITS IN.

DEC R0              ;POINT TO DATAPT

JF0 DPROG           ;IN PROG MODE? YES
```

;R0=DATAPT    R1=DATAIN

```
DBACK:  MOV  A,@R0           ;GET DATAPT
        MOV  R0,A            ;PT TO DATA STORAGE
        CLR  A               ;GET DATAIN AND
        XCH  A,@R1           ;CLEAR IT
        XRL  A,@R0           ;DATA=DATAIN?
        JZ   DOK             ; YES
        CALL NBITF           ;DEACTIVATE BIT VALID FLAG

DOK:    JF1  ECODE           ;PTING TO SW10? YES
        MOV  R0,#DATAPT      ;INC DATA POINTER TO NEXT
        MOV  A,@R0           ;LOCATION
        XRL  A,#TRIDAT+2     ;POINTING TO LAST BYTE IN
        JNZ  IDPT            ;PERMANENT DATA STORAGE? NO
        MOV  @R0,#TRIDT+2    ;YES. SET DATAPT TO SW10 REG.
IDPT:   INC  @R0             ;INCREMENT DATAPT
        JMP  ENEXT           ;START BLANK TIMER,DIS TCNTI, ENABLE
                             ;DATA INTERRUPTS.

ECODE1: CALL NBITF
ECODE:  DIS  I               ;BLRPM DOES NOT TURN OFF INTERRUPTS!
        DIS  TCNTI
        STOP TCNT
        MOV  R0,#FLAGS3      ;GET FLAGS3
        MOV  A,@R0
        JB0  BVLD            ;ALL BITS+BLANK TIME VALID
                             ;IN THIS CODE STREAM? YES
        ORL  A,#SBIT2+SBIT0  ; NO. ACTIVATE THE CODE ERROR FLAG
        JMP  BV1             ;AND THE BIT VALID FLAG
```

```
BVLD.    ORL A,#SBIT1+SBIT0      ;ACTIVATE THE VALID CODE FLAG AND THE
BV1:     MOV @R0,A               ;BIT VALID FLAG.
RTN2:    MOV R0,#FLAGS4
         MOV A,@R0               ;SET BLANK FLAG HIGH.  START: ROUTINE
         ORL A,#SBIT5            ;WILL POLL THE -INT INPUT.  IF IT IS EVER
         MOV @R0,A               ; LOW THE START: ROUTINE WILL RESET THIS
                                 ; FLAG

MOV R0,#TBLK
         MOV @R0,#256-1          ;GET BLANK TIMER GOING AS SOON AS
                                 ;AS POSSIBLE. (DELAY=8.33MSEC MAX)
RTN:     MOV A,R7                ;RETURN FROM INTERRUPT
         SEL RB0
RETRR:   RETR
         JB1 ECODE1              ;OK? NO LOW TOO LONG.
         INC @R1                 ;1MSEC=XXXXXX00(WON'T GET HERE)
                                 ;2MSEC=XXXXXX01
                                 ;3MSEC=XXXXXX10
                                 ;INC DATA IN
         CLR A                   ;RESTART TIMER WITH SYNC PULSE.
         JMP DATT2               ;MUST BE A 2 OR 3 MSEC PULSE.

DPROG:   MOV R0,#CODECT          ;PT TO CODECT
         MOV A,@R0
         ANL A,#00FH             ;MASK OFF ERROR COUNTER
         INC R0                  ;PT TO DATAPTR
         JNZ DBACK               ;VALID CT=0?(FIRST CODE IN?)NO

DPROG1:  MOV A,@R0               ;YES. STORE THESE BITS
         MOV R0,A                ;PUT ADDR OF DATA INTO R0
         ADD A,#0A6H             ;CHECK ADDR TO MAKE SURE THAT
```

```
            JC ECODE1              ;IT IS 56H,57H,58H,OR 59H
            ADD A,#04              ;OK SO FAR.
            JNC ECODE1             ;OK? NO
VADDR:      CLR A                  ;OK. GET DATAIN AND
            XCH A,@R1              ;CLEAR DATAIN
            MOV @R0,A              ;STORE DATA
            JMP DOK

;DATA INTERRUPT ROUTINE
; NOTICE THAT THE INBLANK FLAG IS USED AS AN RPM ROUTINE (FORCE
; PROGRAM) EXECUTE INDICATOR. THE ACTUAL TIMER (TIMBLK) REGISTER
; IS USED TO DETECT IF THE FIRST PULSE ON THE DATA INPUT IS A
; SYNC BIT.

EXTI:       MOV R0,#TBLK           ;GET BLANK TIMER GOING AGAIN
            MOV @R0,#256-2
            MOV R0,#FLAGS4         ;IS THIS A SYNC PULSE?
            MOV A,@R0              ;GET COUNT
            JB0 DATBIT             ;BLANK TIME JUST FINISHED? NO
            ORL A,#SBIT0           ;YES. FLAG THAT DOING SYNC PULSE
            MOV @R0,A
            MOV A,#256-21          ;YES. TIME OUT SYNC PULSE.
                                   ;NOTE. BLANK TIMER IS ZERO!!
            MOV T,A                ;(21=2MSEC. SEE ICONT1:
            STRT T                 ; BELOW)
            MOV R0,#BITPT          ;INITIALIZE BITPT AND DATAPT
            MOV @R0,#(256-3)       ;REGISTERS
            DEC R0
            MOV @R0,#TRIDT         ;DATAPT
            JF0 XINIT              ;IN PROG MODE?
```

```
         MOV @R0,#TRIDAT      ;NO

XINIT.   MOV R1,#DATAIN       ;INIT DATAIN REGISTER

MOV @R1,#0

ICONT1.  MOV A,T              ;GET TIMER. TIMING OUT SYNC

JZ ECODE1            ;PULSE. IF T=0 THEN PULSE
                              ;IS LOW FOR 2MSEC. TOO LONG!!

JNI ICONT1           ;INT INPUT STILL LOW? YES
                              ;NOP. GOT THE SYNC PULSE.

ADD A,#16            ;CHECK IF SYNC IS LOW FOR MORE

JNC ECODE1           ;.5 MSEC. OK? NO

;DO NOT START BLANK TIMER. (SEE EXTI+4)

ICONT4:  ADD A,#4             ;STARTED AT -21 AND ADDED ONLY 16
                              ;ADD 5 MORE. NOTE THAT CPL WILL
                              ;EFFECTIVELY ADD ONE TO COUNT!

INC R1               ;POINT TO SYNC REGISTER

CPL A                ;TWO'S COMPLEMENT+1

MOV @R1,A            ;STORE SYNC COUNT

ENEXT:   DIS TCNTI

STOP TCNT

EN I                 ;WAIT FOR DATA INTERRUPT.

JMP RTN              ;RETURN FORM INTERRUPT.

DATBIT.  MOV A,#256-2         ;2 IS FOR PULSE STRETCHING COMPENSATION.

DATT2:   MOV R0,#SYNC         ;ADD TO ACCUMULATOR SYNC COUNT

ADD A,@R0            ;AND PUT INTO TIMER.

DIS I                ;WAIT FOR A TIMER INTERRUPT.

MOV T,A              ;DO IT, MAN!
```

```
            EN TCNTI

STRT T

JMP RTN                  ;TIMED OUT

NBITF:   MOV R1,#FLAGS3              ;DEACTIVATE THE BITS VALID

MOV A,@R1                   ;FLAG.

ANL A,#RBIT0

MOV @R1,A

RET

GETDIR:  CALL GETDR                  ;GET DOOR DIRECTION

MOV R0,#TBLK                ;GOT HERE BY INTERRUPTS. GET INTERRUPT

MOV @R0,#0FFH               ;GOING AGAIN AS SOON AS POSSIBLE. THIS
                                     ;WILL CONTINUE UNTIL TONE: OR T42:
                                     ;DISABLES THE DIRECTION FLAG (FLAGS4
                                     ; BIT 7).

JMP RTN

FED:     ANL A,#RBIT4                ;FLAG THAT EDGE INTERRUPT IS DONE.

MOV @R1,A                   ; FLAG NOW FOR TIMER ROUTINE.

CALL TDET                   ;DEBOUNCE THE T1 INPUT

JNZ RTN                     ;HIGH NOW? YES. BYE-BYE

JF0 RPML                    ;PROGRAMMING LIMITS? JUST DO MAX FCE

DEC R1                      ;POINT TO PDU

MOV A,@R1

CLR F1                      ;FLAG FOR NO TWEAK

JB1 RPMM                    ;PROGRAMMING DOWN FORCE? YES

JB3 RPMU                    ;PROGRAMMING UP FORCE? YES

CALL MOTDIR                 ;POINT TO PROPER MOTOR DIRECTION
```

```
                MOV A,@R1           ;WITH R1.
RPLL:   MOV T,A
        EN TCNTI            ;TIME OUT LOW TIME WITH TIMER
        STRT T
        JMP RTN

RPMM:   MOV R0,#CLC
        MOV R1,#TWEAK       ;POINT TO TWEAK NUMBER
        MOV A,@R1
        CPL A               ;CLC-TWEAK
        ADD A,@R0
        INC R0
        MOV A,@R0           ;GET CLC MSB
        ADDC A,#0FFH
        JC RPMU             ;WITHIN TWEAK DISTANCE? NO.
        CPL F1              ;YES
RPML:   CALL GETFCE         ;GET MINIMUM FORCE INTO ACC
RPMU:   MOV A,#MINFCE       ;DO PROGRAM FORCE ROUTINE.
        JMP RPLL

RPM:    DIS I
        DIS TCNTI
        JB4 FED             ;INTERRUPT ON THE FALLING EDGE? YES
        MOV R0,#TIMRPM      ;NO FORCE ROUTINE IN 1/2 SEC THEN
        MOV @R0,#256-58     ;OBSTRUCTION.
        DEC R1              ;POINT TO PDU
        JF0 FHH             ;PROGRAMMING LIMITS? YES (MAX FCE)
        MOV A,@R1
        JB1 RPMP            ;PROGRAMMING DWN FORCE? YES
```

```
            JB3 RPMP              ;PROGRAMMING UP FORCE? YES

FHH:    JT1 RPM1             ;NO. TIMED OUT A LOW TIME.

;RPM INPUT HIGH? YES. FORCE IS OK.

JF0 FHIGH            ;NO. PROGRAMMING LIMITS? YES

RPM2:   CALL SYSC            ; NO. FORCE IS TO HEAVY

RPM1:   JMP RTN2             ;BYE

RPMP:   JF1 FHH              ;WITHIN TWEAK DISTANCE OF THE DOWN LIMIT? YES

CALL GETFCE          ;NO.  GET MAXIMUM FORCE INTO ACC

MOV R5,A             ;REMEMBER MAXFCE

JTF N1               ;CLEAR TIMER OVER FLOW FLAG

N1:     ADD A,#0-MINFCE+1    ;ADD ONE TO INCREASE ACTUAL LEARNED FORCE

MOV T,A

STRT T

LOWR:   JTF FHIGH            ;LOW FOR TOO LONG? YES

JNT1 LOWR            ;INPUT STILL LOW? YES

MOV A,T              ;GET THIS COUNT

STOP TCNT            ;NO

CPL A                ;TIMER NOW HAS MAX-MIN+1+CT IN IT

;----THE "CPL A" ADDED ONE TO THE COUNT.

ADD A,R5             ;NEED MIN-CT-2 SO----

;MIN-CT-2=

;MAX-MIN+1      @ N1.

;MAX-MIN+1+CT   @ "STOP TCNT"

;-MAX+MIN+CT+2  @ "CPL A"

;MIN-CT-2       @ "ADD A,R5"

;IE---
```

```
                    ;MAX=C0, MIN=E0, CT=4

;C0-E0+1=E1      @ N1.

;E1+4=E5         @ "STOP TCNT"

;CPL (E5)=1A     @ "CPL A"

;C0+1A=DA        @ "ADD R5,A"

;NOTE THAT MIN-CT-2=E0-6=DA

MOV R6,A            ;STORE THIS FORCE SETTING

CALL MOTDIR

MOV A,R6

CPL A

ADD A,@R1

JNC RPM3

MOV A,R6            ;THIS FORCE IS HEAVIER SO STORE IT

MOV @R1,A

CALL CALCU          ;RECALCULATE CHECKSUM AND STORE IT.

RPM3:   JMP RTN

FHIGH:  MOV R1,#CCSW        ;TURN ON BOTH THE VAC AND WRK LEDS TO
        MOV A,@R1           ;INDICATE THAT THERE IS A PROBLEM WITH
        ORL A,#SBIT6        ;THE (ATK)

MOV @R1,A

CALL FCMIN          ;ACTIVATE THE DOOR CONDITION INDICATOR,
                            ;ACTIVATE PFU AND PDU FLAGS, AND SET
        JMP RPM2            ;FORCES TO MIN

FCMIN:  MOV R1,#PDU         ;ACTIVATE THE PROGRAM UP AND DOWN
        MOV @R1,#SBIT1+SBIT3 ;FLAGS
        MOV R1,#UPFCE       ;SET FORCES TO MIN.
        MOV @R1,#MINFCE
        INC R1              ;UP AND DOWN FORCES.
```

```
            MOV @R1,#MINFCE

CALCU:  CALL CALCS             ;CALCULATE A NEW CHECKSUM

MOV @R1,A              ;STORE IT

RET

GETFCE: IN A,P2                ;GET WOOD DOOR/-FIBERGLASS DOOR

JB4 WD                 ;INPUT. WOOD DOOR? YES

MOV A,#FGDMFC          ;NO. PUT IN LIGHT FORCE.

RET

WD:     MOV A,#MAXFCE

RET

;THE DOOR DIRECTION IS GOTTEN DURING THE ONE SECOND START UP OF THE
;MOTOR AND FOR 4.0 SECONDS AFTER MOTOR SHUT OFF. AFTER A MOTOR TURN OFF,
;THE DIRECTION IS GOTTEN BY A HARDWARE INTERRUPT FOR 1.5 SECONDS (USES
;THE 1.0 SEC TIMER). FROM 1.5 TO 4.0 SECONDS THE DOOR DIRECTION IS
;POLLED FROM THE EDGE: ROUTINE. THIS WAS DONE SO THAT THE TRANSMITTER WILL
;ONLY BE INACTIVE FOR 1.5 SECONDS AFTER MOTOR TURN OFF.

GETDR:  CALL TDET              ;DEBOUNCE JUST INCASE OF NOISE GLITCH

JNZ RPM3               ;HIGH? YES

MOV R1,#FLAGS1

IN A,P2                ;GET RPM2 SIGNAL

JB5 GUP                ;GOING UP? YES

MOV A,@R1              ;NO. GOING UP. FLAG IT

ANL A,#RBIT4

MOV @R1,A

RET

GUP:    MOV A,@R1              ;FLAG THAT MOTION IS DOWN
                               ; T1    P25
```

```
        ORL A,#SBIT4          ;     R1    R2    COMMENT

MOV @R1,A             ;     0     0     DWN

RET                   ;     0     1     UP
```

PAGE

; ((R0))-((R1))=((R0))

; INCREMENTS R0 AND R1

```
SUB:    CLR C                 ; SUBTRACT ROUTINE.

CPL C

CALL SUBT

INC R0                ; NEXT BYTE

INC R1

SUBT:   MOV A,@R1             ; GET SUBTRAHEND

CPL A

ADDC A,@R0

MOV @R0,A

RET
```

; MAIN SUBROUTINES

```
FRCEND: DIS TCNTI

DIS I

MOV R0,#FLAGS4        ; DEACTIVATE THE DOFRCE FLAG. THIS

MOV A,@R0             ; WILL CAUSE THE BLNK ROUTINE TO

ANL A,#RBIT3          ; ENABLE THE FORCE ROUTINE AT THE

MOV @R0,A             ; END OF THE BLANK TIME.

RET
```

; R1 WILL CONTAIN THE ADDR OF EITHER THE UP FORCE OR DOWN

; FORCE BYTES IN RAM (26H OR 27H)

```
MOTDIR: SEL RB0
        MOV A,R7
        SEL RB1
        MOV R1,#UPFCE       ;START WITH UP FORCE
        JB1 MPU             ;MOTOR GOING UP? YES
        INC R1              ;NO. PT TO DOWN FORCE
MPU:    RET

SUB1:   MOV R1,#CHCKPT      ;CHECK IF THIS IS TO BE A
        MOV A,@R1           ;VALID MOTOR START UP.
        XRL A,#055H
        JNZ M2C             ;VALID? NO.

MOV @R1,A           ;CLEAR CHCKPT
        JF0 SUBSET          ;IN PROG MODE? YES
        CALL CALCS          ;NO. CHECK CHECKSUM-IF NOT GOOD
        JNZ S1              ;OK? NO UK.

SUBSET: CALL FRCEND         ;DEACTIVATE THE FORCE ROUTINE STUFF
        MOV R0,#TIM42       ;JUST IN CASE THE LIGHT IS TURNED ON OR
        CLR A               ;OFF WHILE THE MOTOR IS RUNNING.
S1:     RET

MOTDWN: CALL SUB1           ;GET BUS INTO ACC
        JNZ M2C             ;CHECKSUM OK? NO
        MOV A,R7            ;GET BUS PORT
        ORL A,#SBIT2+SBIT1  ;ACTIVATE MOTOR DOWN AND TURN OFF
        JMP STBUS           ;MOTOR UP

MOTUP:  CALL SUB1
        JNZ M2C             ;CHECKSUM OK? NO
```

```
           MOV A,R7              ;GET BUS PORT.  TURN ON MOTOR UP AND

ANL A,#0F9H           ;TURN OFF MOTOR DOWN

STBUS.     XRL A,#SBIT1

MOV R7,A              ;STORE BUS INFO

MOV @R0,#04FH         ;START THE 42 SEC TIMER.

INC R0                ;NEXT BYTE PLEASE

MOV @R0,#0ECH

INC R0                ;PT TO ONE SEC TIMER

MOV @R0,#(256-120)    ;START IT. (120*8.3333MSEC)

;R1=BUSS REG

STTIM:.    CALL TICK

MOV A,#256-27         ;DELAY MOTOR START BY 2.58MSEC.

JTF CHT1              ;CLEAR OVERFLOW FLAG

CHT1:      MOV T,A

STRT T                ;TURN INBLNK AND E/-T FLAGS.
                                   CTRM
           CALL EDGE             ;INC CTRM IF EDGE COMES IN ON RPM INPUT.

JMP CHT               ;KEEP LOOPING

CHT2:      STOP TCNT             ;YES. TIMER SHOULD BE ZERO

MOV A,R7              ;GET BUS INFO

M2B:       OUTL BUS,A            ;OUTPUT IT

M2C:       RET

MOTOF:     CALL SUBSET           ;MOTOR OFF

MOV A,R7              ;GET BUS INFO

ANL A,#0F9H           ;TURN OFF MOTOR UP AND

MOV R7,A              ; MOTOR DWN BITS

MOV @R0,#050H         ;RESTART 42 SEC TIMER FOR TEN SECS
```

```
        INC R0

MOV @R0,#0FBH

INC R0                  ;ACTIVATE THE 1.5 SECOND TIMER

MOV @R0,#256-180

JMP STTIM

LGHTON: CALL SUBSET

MOV R0,#TIM45           ;START THE 4.5 MIN TIMER

MOV @R0,#06FH           ;LOW BYTE

INC R0

MOV @R0,#081H           ;HIGH BYTE

MOV A,R7

ORL A,#SBIT0            ;SET BUS LIGHT BIT ACTIVE.

JMP L1
TICK:   IN A,P1                 ;NO

MOV R5,A                ;SAVE RTC INPUT

T1:     CALL EDGE               ;IF RISING EDGE COMES IN THEN INC CTRPM

IN A,P1

XRL A,R5                ;SEE IF RTC CHANGED STATE

CPL A

JB2 T1                  ;EDGE FOUND? NO

RET
LGHTOF: CALL SUBSET

MOV A,R7

ANL A,#RBIT0

L1:     MOV R7,A                ;TEMPORARILY STORE BUS INFO.

CALL TICK               ;FIND ZERO CROSSING OF AC LINE.

MOV A,#256-53           ;DELAY FOR 53 TICKS OR 5.08MSEC

JMP CHT1                ;FROM ZERO CROSSING. GO TO MOTOR SUB

;EAROM SUBRROUTINES
```

; ENTER IWRITE WITH EACT, WORDPT, AND EAINST REG ALREADY PROPERLY

; INITIALIZED.

```
WRENB:  MOV A, #WREN        ; ENABLE WRITE TO EAROM

DIS I

DIS TCNTI

WRINST: MOV R0, #EAINST     ; STORE ACC INTO EAINST

MOV @R0, A

CLR F1              ; CE=LOW AFTER INST IS OUTPUT.

JMP INST

IWRITE: CALL INSTCH         ; OUTPUT ADDR AND INSTRUCTION TO

CALL DATAOT         ; EAROM. OUTPUT DATA.

MOV R0, #EACT       ; CHECK IF ALL BYTES ARE OUT.
STTIM:  CALL TICK

MOV A, #256-27      ; DELAY MOTOR START BY 2.58MSEC.

JTF CHT1            ; CLEAR OVERFLOW FLAG
        MOV A, @R0

JNZ IWRITE          ; ALL DONE NO

RET                 ; YES.
CLKC:   ANL P2, #RBIT1      ; PUT DI IN A KNOWN STATE

ORL P2, #SBIT3      ; PUT EAROM CE HIGH

CLKT:   ORL P2, #SBIT2      ; PUT CLOCK ON EAROM HIGH

ANL P2, #RBIT2      ; PUT CLOCK ON EAROM LOW

RET
```

; THIS SUBROUTINE IS FOR THE OUTPUTTING OF EAROM REG ADDR,

; DATA, OR INSTRUCTION TO THE EAROM. R0 WILL BE NEEDED

; ALONG WITH R6, R5, R4, AND R3.

; R0-->POINTER TO INST, ADDR OR DATA

; R5-->#  OF BYTES TO BE TRANSFERRED(1 OR 2)

; R6-->#  OF BITS TO BE TRANSFERRED

;MUST SET F1 CORRECTLY BEFORE CALLING EAROM INST.

; F1=1 FOR ALL EAROM INSTRUCTIONS EXCEPT READ,WRT1,WRT7.

; OUTPUTS @R0 THEN (IF NECESSARY) @(R0-1)

```
DATAOT: CALL BYTE2        ;OUTPUT 2 BYTES.

JMP SER5

INSTCH. CLR F1            ;CS ON EAROM=HIGH AFTER ROUTINE

INSTOT. CPL F1

INST:   MOV R0,#EAINST    ;PT TO INSTRUCTION BUFFER

MOV A,@R0         ;DECREMENT EAROM ADDR IN THE

ADD A,#0F8H       ;INSTRUCTION BYTE

MOV @R0,A
        CALL CLKC         ;CLOCK ONCE WITH CE HIGH

; AND DI LOW.

SER1.   MOV R5,#1         ;1 BYTE

SER5.   MOV A,@R0         ;GET DATA

;OUTPUT BIT 7 FIRST

SER3.   RL A              ;NEXT BIT PLEASE

ORL P2,#SBIT1     ;PUT DATA HIGH.

JB0 BHIGH         ;NEXT BIT HIGH? YES

ANL P2,#RBIT1     ;NO. RESET TO ZERO

BHIGH:  CALL CLKT         ;CLOCK EAROM

DJNZ R6,SER3      ;ALL BITS OUT? NO

DEC R0            ;PT TO NEXT BYTE

MOV R6,#8         ;8 BITS TO BE OUTPUT

DJNZ R5,SER1      ;ALL BYTES OUT? NO

JF1 SER4          ;YES. CS TO STAY HIGH? YES

WTDONE. ANL P2,#0F1H      ;NO. (CS,CLK,&DI=0)

CALL CLKT         ;TOGGLE CLK

SER4:   RET
```

```
;EAROM SUBROUTINE TO READ IN EAROM (16 BYTES)

;USES R0,R3,R5,R6

;ALSO DECREMENTS EACT

EADAIN: MOV A,#RCL
        CALL WRINST        ;RECALL PERMANENT STUFF.

MOV R0,#EACT

MOV @R0,#256-9     ;READ 9 WORDS

DEC R0             ;PT TO WORPT.  START AT EAROM

MOV @R0,#031H+002H ;ADDRESS 8.  AND RAM ADDR 31

DEC R0

MOV @R0,#READ8     ;READ INSTRUCTION TO EAROM

; ADDR=8+1
        CALL WRINST        ;RECALL PERMANENT STUFF.

MOV R0,#EACT

EADAC:  CALL INSTCH        ;EA DATA CONTINUE

CALL BYTE2         ;GET 2 DATA BYTES

ORL P2,#SBIT0      ;D0=1

DIN1:   CLR A              ;ZERO OUT INPUT BUFFER

DIN.    RL A
        MOV @R0,A          ;INPUT IT INTO CORRECT LOCATION
        IN A,P2            ;GET DATA
        ANL A,#SBIT0       ;DATA COMES IN ON BIT ZERO
        ORL A,@R0          ;CONSTRUCT BYTE
        CALL CLKT          ;CLOCK EAROM
        DJNZ R6,DIN        ;ALL BITS IN? NO
        MOV R6,#8          ;8 BITS IN NEXT BYTE
        MOV @R0,A          ;YES. STORE DATA
        DEC R0             ;PT TO NEXT REG
```

```
        DJNZ R5,DIN1            ;2 BYTES IN? NO

ANL P2,#0F1H            ;YES. CS=CLK=DI=0

MOV R0,#EACT            ;CHECK IF DONE.

INC @R0                 ;EACT INCREMENTS TO 0.

MOV A,@R0

JNZ EADAC               ;LAST BYTE IN? NO

CALL CALCS              ;CALCULATE CHECKSUM

XRL A,@R1               ;COMPARE THEM

MOV R0,#SFLAG1

MOV R1,#FLAGS1

JZ DATAOK               ;CHECKSUMS COMPARE? YES
        MOV @R1,#SBIT1+SBIT7    ;NO. ACTIVATE LIMITS UNKNOWN FLAG AND

MOV R1,#CCSW            ;CLEAR OUT THE CLC

MOV @R1,#0

CLRLIM: MOV A,#0FFH             ;ACTIVATE THE DWN LIMIT FLAG. (NOTE THAT
                                ;MOTOR DIRECTION FLAG,BIT 5, IS DOWN!)

MOV R1,#CLC             ;ON POWER UP, IF BOGUS INFORMATION IS

MOV R2,#4               ;STORED THEN SET LIMITS AND CLC TO FFFFH.

CLRCLC: MOV @R1,A

INC R1

DJNZ R2,CLRCLC          ;4 REGISTERS CLEARED YET? NO

RET                     ;YES.

DATAOK: MOV A,@R0               ;PUT SFLAG1---->FLAGS1

MOV @R1,A

MOV R0,#SCCSW           ;POINT TO SCCSW

MOV A,@R0               ;GET IT

CCSET:  MOV R1,#CCSW            ;STORE SCCSW INTO CCSW
```

```
            MOV @R1,A

RET

TDET:       CLR A

TL:         JT1 TH              ;T1 HIGH? YES

JT1 TH              ;DEBOUNCE ROUTINE FOR T1 INPUT

JT1 TH

RET                 ;IF T1=LOW THEN ACC=0

TH:         JNT1 TL             ;T1=LOW? YES

JNT1 TL

JNT1 TL

DEC A

RET                 ;IF T1=HIGH THEN ACC=0FFH

EDGE:       MOV R1,#FLAGS2      ;SEE IF 1 FALLING EDGE HAS COME
            CALL TDET           ;DEBOUNCE T1 INPUT
            MOV A,@R1           ;NO. (GET FLAGS2)

JB0 EDGEL           ;LRI FLAG HIGH? YES

RET                 ;NO

EDGEL:      ANL A,#RBIT0        ;FLAG THAT T1 IS LOW

MOV @R1,A

MOV R1,#CTRPM       ;INCREMENT THE CTRPM REGISTER

INC @R1

MOV A,R7            ;POLL THE DIRECTION FOR THE TIME INTERVAL

JB1 EDR             ;1.5 TO 10 SECS AFTER MOTOR TURN OFF

JB2 EDR             ;MOTOR ON? YES. THE INTERRUPT ROUTINE

MOV R1,#TIM1        ;WILL TAKE CARE OF THE DIRECTION

MOV A,@R1           ;

JNZ EDR             ;1.5 SEC TIMER ACTIVE? YES

CALL GETDR          ;NO. POLL DIRECTION

RET
```

```
EDH:    MOV  A,@R1         ;GET FLAGS2

JB0  EDR            ;LRI FLAG HIGH? YES

ORL  A,#SBIT0       ;NO. FLAG THAT T1 IS HIGH

MOV  @R1,A

EDR:    RET

SYSC:   MOV  A,#FLAGS1      ;ACTIVATE THE SYSTEM COMMAND

XCH  A,R0           ;FLAG FOR MOTOR OPERATION

XCH  A,@R0          ;DO NOT LOSE R0 THOUGH!!

ORL  A,#SBIT2       ;ACTIVATE FLAG
        XCH  A,@R0          ;GET ORIGINAL R0 INTO ACC

MOV  R0,#CHCKPT     ;FLAG MOTOR ACTIVATION ALSO

MOV  @R0,#055H      ;IN ANOTHER REGISTER FOR

MOV  R0,A           ;VALIDATION OF A LEGITIMATE

RET                 ;CMND. PUT ORIGINAL R0 BACK.

TESTT:  MOV  A,@R0          ;TESTS A TWO CONSECUTIVE BYTES TO

INC  R0

JZ   TEST1          ;TO SEE IF THEY ARE ZERO

RET

TEST1:  MOV  A,@R0

RET

CALCS:  MOV  R1,#TWEAK+1    ;CALCULATE THE CHECKSUM FOR THE

MOV  A,#1           ;REG 31+REG 2F+...REG 25=CHECKSUM

MOV  R3,#14         ;12 LOCATIONS

CA:     ADD  A,@R1

DEC  R1

DJNZ R3,CA          ;DONE? NO

MOV  R1,#CHSUM

RET
```

```
BYTE2:  MOV R5,#2               ;2 BYTES TO BE MOVED

MOV R0,#WORDPT          ;PT TO WORD PT FOR EAROM

MOV A,@R0               ;ROUTINE. PT TO WORD IN RAM

DEC A                   ;SUBTRACT TWO FROM RAM ADDRESS.

DEC A

MOV @R0,A               ;STORE NEW ADDRESS

MOV R0,A                ;POINT TO REG

MOV R6,#8               ;8 BITS.

CLR F1

DNEA:   RET

;STDR ENABLES THE TIMER/COUNTER AS A COUNTER TO INTERRUPT
  STDR: DIS TCNTI               ;START DIRECTION SEARCH.

STOP TCNT

CALL RETRR              ;RELIABILITY ONLY

MOV A,#0FFH

MOV T,A

EN TCNTI

STRT CNT

MOV @R0,#256-3          ;RESTART BLANK TIMER

RET

CHBL:   JNI BLOW                ;-INT INPUT LOW? YES

RET                     ;NO

BLOW.   MOV R0,#FLAGS4

MOV A,@R0               ;RESET BLANK FLAG.  START: ROUTINE

ANL A,#RBIT5            ;WILL POLL -INT PIN.  IF LOW IT WILL

MOV @R0,A               ;RESET THIS FLAG

RET

BYTE0:  INC R0

BYT00:  CLR C                   ;TESTS A SINGLE BYTE TIMER
```

```
            MOV A,@R0           ;IF THE TIMER TIMES OUT THEN
            JZ DNE              ;THE CARRY IS SET.  ALSO EXITS
                                ;WITH THE TIMER IN THE ACCUMULATOR
INCT:       ADD A,#1            ;INCREMENT THE TIMER
            MOV @R0,A
DNE:        RET
BYTET.      INC R0
BYTT:       CLR C               ;TEST A DOUBLE BYTE TIMER
            CALL TESTT          ;AND SEE IF IT IS ACTIVE.
            JZ DNE              ;TIME OUT INDICATED BY CARRY=1
            DEC R0              ;TIMER DOES NOT TIME OUT THEN
            MOV A,@R0           ;INC DOUBLE BYTES
            CALL INCT           ;INCREMENT THIS
            INC R0
            CLR A
            ADDC A,@R0
            MOV @R0,A           ;RETURN WITH MSB IN ACC
            RET
BLDCI:      CALL SYSC
            MOV R1,#CCSW        ;ALTERNATELY BLINK THE VAC AND WRK LEDS
            MOV A,@R1           ;ON THE CONTROL CASE TO SIGNAL THAT THERE
            ORL A,#SBIT4        ;IN THE GDO HEAD WITH ONE OF THE RPM
            MOV @R1,A           ;SIGNALS
            RET
PAGE
;THIS FILE INITIALIZES THE PORTS AND RAM FOR THE 8049
;MICROPROCESSOR CHIP FOR A GDO APPLICATION.
INITL:      MOV A,#058H         ;CCASE LEDS OFF & FLIP FLOP
            MOV R7,A
            OUTL BUS,A          ;RESET ACTIVE. ALSO D6 RESET
```

```
                        ;CIRCUIT HIGH (INACTIVE).

MOV R1,#CCSW

MOV A,@R1           ;STORE CCSW INTO R6

MOV R6,A
        MOV A,@R1           ;STORE FLAGS1 IN ACC

MOV R2,#TIMDCI-TWEAK+1 ;CLEAR MOST OF RAM

MOV R0,#TWEAK+2

TIMERS: MOV @R0,#0          ;CLEAR LOCATION

INC R0

DJNZ R2,TIMERS      ;DONE? NO

MOV R0,#(TKY+1)     ;TKY TIMER ROUTINE WILL SET

MOV @R0,#0FFH       ;T/F TO TEN AND KEYPT=KEYS

MOV @R1,A           ;STORE FLAGS1 BACK AGAIN.

MOV A,R6            ;GET CCSW

CALL CCSET          ;RESTORE CCSW

CALL CALCS

XRL A,@R1

JZ RAMOK            ;RAM STILL GOOD? YES

CALL EADAIN         ;NO. READS EAROM AND IF INFO IS NOT GOOD

;THEN ACTIVATES LIMITS UNKNOWN FLAG AND

;SETS CLC AND LIMITS REGISTERS TO ZERO.

RAMOK:  CALL LGHTON         ;TURN ON LIGHT!

;TIMER ROUTINE. INCREMENT ACTIVE TIMERS ON THE RISING OF THE
;REAL TIME CLOCK EVERY 8.333 MSEC.
START:  ORL P1,#0FFH        ;INITIALIZE P1

MOV A,#0F1H
```

```
            OUTL P2,A              ; INITIALIZE P2

MOV A,PSW              ; CHECK PSW TO SEE IF ZERO

ANL A,#007H            ; CLEAR OTHER FLAGS IN PSW

JNZ RESETA             ; PSW OK? NO. CPU IS BOGUS!

CALL CHBL              ; IF INTERRUPT PIN IS LOW-RESET BLANK FLAG

IN A,P1                ; NO.  GET RTC BIT

MOV R1,#FLAGS2

XRL A,@R1              ; CHECK AGAINST RTC BIT IN RAM

JB2 ST1                ; RTC BIT FLIP? YES
ST2:        JMP MAIN               ; NO
RESETA.     JMP RESET              ; RESET: IS AT END OF PROGRAM! WILL
                                   ; DO A HARDWARE RESET OF THE CHIP.

ST1.        MOV A,@R1              ; GET FLAGS2

XRL A,#SBIT2           ; FLIP THE RTC BIT

MOV @R1,A

MOV R0,#TIM45          ; YES. CHECK OUT ACTIVE TIMERS

CALL BYTT              ; SEE IF 4.5 MIN TIMER

JNC T42                ; TIMER TIMED OUT. NO

MOV R1,#CCSW           ; YES. SEE IF WORK LIGHT IS ACTIVE

MOV A,@R1

JB3 T42                ; ACTIVE? YES

CALL LGHTOF            ; NO

T42:        CALL BYTET             ; 42 SEC OR 10 SEC LIMITS TIMER
                                   ; COUNT LIMITS FOR 42 SECONDS AFTER MOTOR
                                   ; TURN ON AND 10 SECS AFTER MOTOR TURN
                                   ; OFF.

TONE.       CALL BYTEO             ; ONE SEC TIMER

INC R0                 ; POINT TO RECEIVER TIMER

JNZ TREV               ; IF ONE-SEC TIMER IS ACTIVE IGNORE RECIEVER
```

```
        MOV R1,#FLAGS4        ;YES. DEACTIVATE THE GET DOOR
        MOV A,@R1             ;DIRECTION FLAG
        ANL A,#RBIT7
        MOV @R1,A
        MOV A,R7              ;SEE IF MOTOR IS ON AND THAT IT IS
        MOV R1,#FLAGS1        ;MOVING IN THE PROPER DIRECTION.
        JB2 DG                ;GOING DOWN? YES
        JB1 UG                ;GOING UP? YES
        JMP TREC              ;MOTOR IS OFF

DG:     MOV A,@R1             ;GET FLAGS1
        JB4 CC                ;DOWN RELAY ACTIVE. MOVING DOWN? NO.
                              ;(POSSIBLY PHOTOTRANSISTOR ON P25 IS BAD)
        JMP TOC               ;YES. EVERYTHING IS A-O-K
UG:     MOV A,@R1             ;MOTOR UP RELAY IS ACTIVE.
        JB4 TOC               ;GOING UP? YES
CC:     CALL BLDCI            ;MOTOR AND DIRECTION FLAG DON'T AGREE.
        JMP TREC              ;TURN MOTOR OFF AND BLINK THE DCI.
TOC:    MOV R1,#TIMRPM        ;YES. FORCE ROUTINE IN 1/2 SEC THEN
        MOV @R1,#256-58       ;OBSTRUCTION
        JF0 TREC              ;IN PROGRAM MODE, DO NOT MESS WITH
                              ;LIMIT FLAGS.
        MOV R1,#FLAGS1        ;DEACTIVATE THE DOWN
        MOV A,@R1             ;LIMIT FLAG AND
        ANL A,#0FCH           ;THE UP LIMIT FLAG.
        MOV @R1,A
        MOV A,R7              ;TURN ON OPEN DOOR INDICATOR
        ANL A,#RBIT3
        MOV R7,A
        OUTL BUS,A
```

```
TREC:    CALL BYTOO          ; DO NOT INCREMENT R0

JNC TREV            ; VALID OR ERROR CODE TIMER TIME OUT? NO

MOV R1,#CODECT      ; YES. NO CODES IN 300 MSECS. CLEAR OUT

MOV @R1,#0          ; VALID AND ERROR CODE COUNTERS

TREV:    CALL BYTE0          ; REVERSE TIMER

JNC TSWDEB          ; TIMER OUT?

CALL SYSC           ; ACTIVATE A SYS COMMAND

TSWDEB.  CALL BYTE0          ; SWITCH DEBOUNCE TIMER

JNC TCCTA           ; TIME OUT? NO

MOV R1,#SW          ; GET THE SWITCH CLOSURE REGISTER

MOV A,@R1           ; GET PRESENT STATE OF PROG AND 1" SW

INC R1              ; POINT TO CURRENT STORED STATE

XRL A,@R1           ; SEE WHICH ONE IF ANY CHANGED

MOV R2,A            ; SAVE SWITCH THAT CHANGED

XRL A,@R1           ; FLIP THE STORED VALUE THAT CHANGED

MOV @R1,A           ; AND STORE IT

MOV A,R2            ; GET THE SWITCH THAT CHANGED FLAGS

JB7 ONEI            ; 1" SWITCH CHANGE STATE? YES

CPL A

JB3 TCCTA           ; PROGRAM SWITCH CHANGE STATE? NO

MOV A,@R1           ; YES

JB3 TCCTA           ; SWITCH PRESSED? NO. (ACTIVE LOW).

CPL F0              ; YES. INVERT PROGRAM MODE FLAG

JF0 GOPROG          ; JUST GO INTO PROGRAM MODE? YES

JMP CCH             ; NO

GOPROG:  MOV @R1,A
         MOV R1,#FLAGS1

MOV A,@R1           ; SET   LIMIT FLAGS1 ACCORDING TO THE

ANL A,#0FCH         ; PUP/-PDWN FLAG
```

```
            ORL A,#SBIT0           ;FLAG UP LIMIT

JB5 UPLST              ;MOVED UP LAST TIME? YES

XRL A,#SBIT0+SBIT1     ;NO.  FLAG DOWN LIMIT

UPLST:      MOV @R1,A              ;STORE FLAGS1

CALL FCHIN             ;PROGRAMMING U/-D FORCE
                                   ;SIGNAL TO PROGRAM FORCE
                                   ;DOWN AND PROGRAM FORCE UP'

MOV A,R7               ; (PFD&PFU)

ANL A,#RBIT7           ;PUT FORCES AT MINIMUM LEVELS.

MOV R7,A

OUTL BUS,A             ;TURN OFF DCI

CCH:        MOV R1,#CCSW

MOV A,@R1              ;RESET THE VAC,WRK,BAD GDO, AND EXC FORCE

ANL A,#0A3H            ;FLAGS

MOV @R1,A

TCCTA:      JMP TCCT

ONEI.       MOV A,@R1              ;GET STORED SWITCH REGISTER

JB7 TCCTA              ;1" SWITCH ACTIVE? NO.

MOV R1,#TWEAK          ;YES

MOV A,#12              ;LOWER DOWN LIMIT BY 3/8"

MOV R2,A               ;R2 IS USED TO ADD 12 TO CLC AND LIMITS

ADD A,@R1              ;ADD THIS TO TWEAK.  TWEAK IS USED SO THAT

MOV @R1,A              ;WHEN THE FORCE IS RELEARNED WHEN THE DOOR
                                   ;HITS THE FLOOR THIS FORCE IS NOT LEARNED.

MOV R0,#CLC            ;ADD 12 TO BOTH THE CLC AND THE LIMITS

CALL ADD               ;REGISTER PAIR. THIS LOWERS THE DOWN LIMIT!
            INC R0                 ;POINT TO LIMITS

MOV R2,#12

CALL ADD

CALL CALCU             ;NEW CHECKSUM
```

```
TCCT.      MOV R0,#SWDB
           CALL BYTE0              ;CONTROL CASE TIMER

TAUXOB.    CALL BYTE0              ;AUXILLARY OBSTRUCTION TIMER
           JNC TBLNK               ;TIME OUT?
           MOV R1,#FLAGS1          ;YES
           MOV A,@R1
           XRL A,#SBIT3            ;INVERT AUX OBS FLAG
           MOV @R1,A
           CPL A
           JB3 TBLNK               ;SEE IF AUX OBS IS ACTIVE? YES

TAUX1.     MOV A,R7                ;YES. IF MOTOR IS GOING DOWN
           CPL A                   ;AND AUXILLARY OBS IS ACTIVE
           JB2 TBLNK               ;THEN ACTUATE A SYS CMND
           CALL SYSC

TBLNK.     CALL BYTE0              ;BLANK TIMER FOR TRANSMITTER
           JNC TKS1                ;TIME OUT? NO
           DIS I
           MOV R1,#FLAGS4
           MOV A,@R1               ;GET FLAGS4
           ANL A,#RBIT3            ;TURN OFF FORCE ROUTINE FLAG
           JB7 ETCT                ;LOOK FOR MOTOR DIRECTION? YES
           DIS TCNTI               ;NO
           MOV A,R7                ;SEE IF MOTOR IS ON
           ANL A,#SBIT1+SBIT2
           JZ DXMIT                ;MOTOR ON? NO. MAY DO XMITTER
                                   ;STUFF NOW.
           DEC R1                  ;GET PDU
           MOV A,@R1
           INC R1                  ;POINT TO FLAGS4
```

```
        JB1 FAGAIN              ;PROGRAMMING FORCE? YES.

JB3 FAGAIN              ;PROGRAMMING FORCE? YES

MOV A,@R1               ;GET FLAGS4

JB3 DXMIT               ;JUST DO FORCE ROUTINE? YES. DO XMIT.

FAGAIN: MOV A,@R1               ;GET FLAGS4

FAGIN.  ORL A,#SBIT3+SBIT4+SBIT6  ;FLAG TO DO FORCE ROUTINE AND ALSO END

ETCT.   MOV @R1,A               ;OF BLANK TIME.

CALL STIR               ;LOAD TIMER AND ENABLE TIMER COUNTER

JMP TKS

DXMIT.  MOV A,@R1               ;GET FLAGS4

JB6 DXM                 ;FINISH OF ACTUAL BLANK TIME? YES

ORL A,#SBIT6            ;NO.  SIGNAL END OF BLANK TIME AND GET

MOV @R1,A               ;THE BLANK TIMER GOING FOR 8 TO 16 MSEC

MOV @R0,#256-2          ; NOTE—AFTER BIT 10 OF A CODE THE RECEIVER

JMP TKS                 ; PROGRAM SETS THE BLANK FLAG AND GETS

; THE BLANK TIMER GOING FOR 0 TO 8MSECS.

; WHEN THAT TIMES OUT THIS IS NOT THE ACTUAL

; BLANK TIME. THE TIMER MUST BE RESTARTED FOR

; 8 TO 16 MORE MSECS.  THIS WAS DONE THIS

;WAY TO ALLOW THE FORCE ROUTINE TO GET

;GOING AS FAST AS POSSIBLE.

DXM:    ANL A,#0B6H             ;NO. USE INTERRUPTS FOR THE TRANSMITTER.
                                ; ACTIVATE LOOKING FOR A SYNC PULSE,

; DEACTIVATE THE DO FORCE (DOFCE) FLAG

MOV @R1,A               ; AND NOT BLANK TIME FLAG

JB5 NOPROB              ;BLANK TIME CLEAN? YES

CALL NBITF              ;NO.  ;DEACTIVATE THE BITS VALID FLAG

NOPROB. MOV A,#256-4            ;WAIT FOR DATA INTERRUPT FOR 33-42 MSEC

MOV @R0,A               ;LOAD TIMER FOR CHECK AT TKS1:
        EN I
```

| | | |
|---|---|---|
| TKS1. | JZ NOPROB | ;IF BLANK TIMER IS NOT ON THEN START IT |
| TKS. | CALL BYTE0 | ;KEYBOARD DEBOUNCE TIMER |
| TRRPM: | CALL BYTE0 | ;NO FORCE ROUTINE IN 1/2 SEC THEN |
| | JNC TKEYS | ;OBSTRUCTION. TIME OUT? NO |
| | CALL BLDCI | ;BLINK THE DCI AND TURN OFF THE MOTOR |
| TKEYS: | CALL BYTET | ;KEY BOARD TIMER (5&10SEC) |
| | JNC TILED | ;TIME OUT? YES |
| | MOV R1,#KEYPT | ;RESET KEY-POINTER |
| | MOV @R1,#KEYS-1 | |
| | MOV R1,#FLAGS2 | ;FLAG 10SEC TIMER |
| | MOV A,@R1 | |
| | ORL A,#SBIT1 | |
| | MOV @R1,A | |
| TILED: | MOV R1,#CCSW | |
| | CALL BYTE0 | ;CONTROL CASE LED TIMER |
| | JNZ MAIN | ;TIMER ACTIVE? YES |
| | JB2 VACDWN | ;VAC UP? YES |
| | JMP LE1 | ;BOTH SWITCHES ARE OFF. TURN OFF LEDS. |
| CHVAC: | JB2 WAS | ;VAC ACTIVE? YES |
| | JMP WRKUP | ;NO. JUST WRK |
| WAS: | MOV @R0,#254 | ;BOTH SWITCHES ARE ON |
| | XRL A,#SBIT4+SBIT6 | ;EXAMINE THE BAD GDO AND EXC FORCE FLAGS |
| | JB4 EXF | ;EXCESSIVE FORCE? YES |
| | MOV @R0,#256-38 | ;NO. ALTERNATELY BLINK THE LEDS TO |
| EXF: | MOV A,R7 | ;INDICATE A PROBLEM WITH THE UNIT. |
| | JB5 VACDWN | ;WRK ON? YES |
| WRKUP: | MOV A,R7 | ;NO |
| | ORL A,#SBIT4+SBIT5 | ;TURN ON WRK/UP LED |
| | JMP OUTB | |

```
LEPROG. MOV @R0,#256-33      ;BLINK LEDS EVERY 1/3 SEC.

MOV A,R7

JB5 LE1              ;LEDS ON? YES

JB4 LOFF             ;LEDS OFF? YES

LE1:    MOV A,R7             ;LEDS ARE ON!

ANL A,#RBIT5         ;TURN OFF LEDS

ORL A,#SBIT4

JMP OUTB

LOFF:   MOV R1,#FLAGS1       ;CHECK IF PROGRAMMING UP LIMIT.

MOV A,@R1            ;DO THIS BY CHECKING THE UP LIMIT FLAG

JB5 WRKUP            ;PROGRAMMING UP LIMIT? YES. FLASH THAT LED.
VACDWN: MOV A,R7             ;TURN ON VAC/DWN LED

ANL A,#0CFH

OUTB:   MOV R7,A

OUTL BUS,A

; DB5  DB4  / OUTPUT
        ;--------------------
        ;  0    0     VAC/DN ON      (+28)
        ;  1    0     INVALID        (GND)
        ;  0    1     BOTH LEDS OFF  (OPEN)
        ;  1    1     WRK/UP ON      (GND)
PAGE

;THE FIRST PART HERE CONTROLS THE MOTOR. THE NEXT SECTION
;CONTROLS THE CONTROL CASE(CC).

MAIN.   MOV R1,#FLAGS1       ;PT TO FLAGS1

MOV A,@R1            ;GET FLAGS1

JB2 MAIN1            ;ACTIVE? YES

JMP EMAIN            ;NO

DMOTTA: JMP DMOTT
```

```
MUP1A:  JMP MUP1

MUP2A:  JMP MUP2

EMAN3A: JMP EMAIN3

MAIN1:  CALL FRCEND             ;YES

MOV R1,#FLAGS1

MOV R0,#TIMRPM          ;TURN OFF FORCE ROUTINE FAIL

MOV @R0,#0              ;BACKUP TIMER  NO FORCE ROUTINE IN

MOV R0,#TIMREV          ;1/2 SEC THEN OBSTRUCTION

MOV @R0,#0              ;TURN OFF 1/2 SEC REVERSE TIMER

MOTCH:  MOV A,R7                ;GET MOTOR DIRECTION
        JB1 EMAN2A              ;MOTOR UP BIT. ACTIVE? YES

JB2 DMOTTA              ;NO. MOTOR GOING DOWN? YES

JF0 INPRG1              ;IN PROGRAM MODE? YES

MOV R0,#FLAGS2          ;NO

;R0=FLAGS2   R1=FLAGS1

MOV A,@R1               ;GET FLAGS1

JB7 EMAN3A              ;LIMITS UNKNOWN? YEP

MOV A,@R0               ;GET FLAGS2

ANL A,#RBIT4            ;TURN OFF AUTO REVERSE FLAG

XCH A,@R0               ;STORE IT AND GET OLD FLAGS1

JB4 MUP1A               ;MOTOR REVERSING? YES

MOV A,@R1               ;GET FLAGS1

JB1 MUP2A               ;AT DOWN LIMIT? YES

JB3 MUP2A               ;AUX OBS ACTIVE? YES

ANL A,#RBIT5            ;PUP/-PDWN FLAG=DWN

MOV @R1,A

MDN:    CALL MOTDWN             ;MOVE DOOR DOWN

JMP MAC1                ;GO SIGNAL A MOTOR ACTIVATION
```

```
EMAIN3: CALL MOTOF            ;TURN OFF MOTOR WITHOUT ENABLING THE

JMP MAC2              ;THE DOOR DIRECTION FIND ROUTINE

DMOTT:  MOV A,@R1             ;GET FLAGS1-CHECK LIMIT FLAGS

JB1 EMAN2A            ;DOWN LIMIT ACTIVE? YES
        JF0 EMAN2A            ;NO. TURN OFF MOTOR IF IN PROGRAM
                              ;MODE.

MOV A,@R1             ;NO.  GET FLAGS1

JB0 EMAN2A            ;AT UP LIMIT? YES

INC R1

MOV A,@R1             ;GET FLAGS2

ORL A,#SBIT4          ;ACTIVATE 1/2 SEC TIMER WITH AUTO REV

MOV @R1,A

MOV @R0,#196          ;START REVERSE TIMER FOR 1/2 SEC

EMAN2A: JMP EMAIN2            ;BYE
        ;IN PROGRAM MODE.

INPRG1: MOV A,@R1             ;GET FLAGS1

ANL A,#0FCH           ;RESET LIMIT FLAGS

ORL A,#SBIT0          ;SET THE UP LIMIT

JB5 IPUP              ;PUP/-PDWN FLAG=UP? YES

XRL A,#SBIT0+SBIT1    ;NO. INVERT LIMIT FLAGS

IPUP:   MOV @R1,A

MOV R0,#CCSW

MOV A,@R0             ;GET CCSW

JB2 MDNA              ;DOWN SWITCH ACTIVE? YES

JB3 MUP               ;UP SWITCH ACTIVE? YES

EMAIN2: CALL MOTOF            ;MUST OF LET GO OF THE UP OR DWN

CALL MACSUB

MOV @R0,#256-10       ;DONT ACTIVATE DIR UNTIL RELAY CONTACTS

JMP MAC2              ;SEPERATE

MDNA:   JMP MDN
```

```
MACSUB: MOV R0,#FLAGS4        ;GET FLAGS4 SIGNAL TO GET MOTOR
        MOV A,@R0             ;DIRECTION
        ORL A,#SBIT7
        MOV R0,#TBLK
        RET

MUP1:   MOV A,@R1             ;GET FLAGS1
MUP2:   JB0 MAC2              ;@UP LIMIT? YES
        ORL A,#SBIT5          ;PUP/-PDWN FLAG=UP
        MOV @R1,A
MUP:    CALL MOTUP            ;NO
MAC1:   CALL LGHTON
MAC:    CALL MACSUB           ;GET FLAGS4.
        CALL STDR

MAC2:   MOV R1,#FLAGS1
        MOV A,@R1             ;GET FLAGS1
        ANL A,#RBIT2          ;TURN OFF SYSC FLAG
        MOV @R1,A
        MOV R0,#CHCKPT        ;DOUBLE CHECK FOR SYSC FLAG.
        MOV @R0,#0            ;CLEAR CHCKPT

;HERE IS THE CONTROL CASE ROUTINE.

EMAIN:  MOV R1,#TIMCC
        MOV R0,#CCINP
        IN  A,P1              ;TAKE A LOOK AT THE CC INPUT
        CPL A
        JB1 CCHIGH            ;CC INPUT HIGH? YEP
        MOV A,@R0             ;GET CCINP REG
```

```
        ANL A,#RBIT6          ;DEACTIVATE LCCIH FLAG

XCH A,@R0             ;(LAST CONTROL CASE INPUT HIGH)

JB6 LEDGE             ;LAST CC INPUT HIGH?LCCIH? YEP
                              ;LCCIH=LOW--NOT LEADING EDGE

JB1 CMNDH             ;CMND TEMP INPUT STILL HIGH? YES

MOV A,@R1             ;NO. INPUT IS LOW. DEBOUNCE CMND LOW?

ADD A,#6              ;247+3=250--16 TO 24 MSEC

JNC MBYE              ;LOW FOR 16-24? NO

EMC:    CLR A                 ;YES

MOV @R1,A             ;TURN OFF DEBOUNCE TIMER. (=0)

INC R0                ;PT TO CCSW

MOV A,@R0

JB1 MBYE              ;IS CMND FLAG HIGH?ACTIVE? YES

ORL A,#SBIT1          ;NO. SET CMND BIT HIGH

MOV @R0,A

JF0 CPROG             ;NO

JMP PSYS              ;INITIATE A SYS CMND THEN MBYE.

CMNDH:  ANL A,#RBIT1          ;CMND TEMP BIT=0

MOV @R0,A             ;STORE CCINP

JMP TIMCCD

CPROG:  MOV R1,#FLAGS1        ;IN PROGRAM MODE THE COMMAND BUTTON WILL

MOV A,@R1             ;CHANGE WHICH LIMIT IS TO BE PROGRAMMED

XRL A,#SBIT5          ;INVERT THE PUP/-PDWN FLAG

MOV @R1,A

JMP MBYE              ;THIS IS INITIALIZED AT GOPROG

;R0=CCINP, R1=TIMCC
```

```
LEDGE:  MOV A,@R0        ;CHECK IF SWITCH ACTIVE FLAG IS
        JB5 HBYE         ;ACTIVE HUH? YES. (MUST DEBOUNCE
                         ;SWITCH OFF BEFORE REACTIVATING).

MOV A,#247       ;REINITIALIZE TIMCC
        XCH A,@R1        ;GET TIMCC BEFORE INITIALIZING
        MOV R1,#CCDEB    ;TIMCC=252 TO 255--VAC SW(5-8 CTS)
                         ;   "  =249 TO 251--WRK SW (2-4 CTS)
                         ;    248<TIMCC<247----NO GOOD

ADD A,#4         ;GOT TIMCC IN ACC
        MOV R3,#SBIT2    ;FLAG VAC SW
        JC CCSUB         ;VAC SWITCH? YEP
        MOV R3,#SBIT3    ;NO. FLAG WRK SW
        ADD A,#3
        JC CCSUB         ;WORK SWITCH? YES
DRST:   MOV @R1,#252     ;START DEBOUNCE TIMER
        JMP HBYE

;R0=CCINP  R1=CCDEB

CCSUB:  MOV A,R3         ;GET BIT.
        ANL A,@R0        ;CHECK IF DEBOUNCE IS STARTED
        JNZ SCCD         ;YES.
        MOV A,@R0        ;NO. START DEBOUNCE TIMER
        ANL A,#0F3H      ;TURN OFF CMND,VAC&WRK FLAGS INCCINP.
        ORL A,R3         ;SET APPROPRIATE BIT
        MOV @R0,A        ;STORE IT
        JMP DRST

PSWW:   MOV A,R3         ;MOTOR IS OFF. GET UP OR DOWN BIT.
        XCH A,@R1        ;GET CCSW
        ANL A,#0F1H      ;TURN OFF WRK,VAC AND CMND SWITHCES
        ORL A,@R1        ;TURN ON BIT THAT WAS IN R3
```

```
            MOV @R1,A
            JMP PSYS

SCCD:       MOV A,@R1               ;GET CCDEB
            JZ MBYE                 ;ALREADY DEBOUNCED? YES
            INC @R1                 ;NO. DEBOUNCE=FOUR COUNTS
            MOV A,@R1               ; ON ONE SWITCH CLOSURE.
            JNZ MBYE                ;DEBOUNCED YET? NO
            MOV R1,#CCINP           ;YES.
            MOV A,@R1               ;ACTIVATE THE SWITCH ACTIVE FLAG.
            ORL A,#SBIT5
            MOV @R1,A
            INC R1                  ;POINT TO CCSW

CCSEND.     JF0 PSWW                ;IN PROG MODE? YES
            MOV A,R3                ; GET VAC OR WRK BIT
            XRL A,@R1               ;FLIP APPROPRIATE BIT.
            MOV @R1,A
            MOV A,R3                ;SEE IF WRK LIGHT SW WAS
            CPL A                   ;THE ONE THAT WAS DEPRESSED.
            JB3 MBYE                ;WRK PRESSED? NO

WRK.        MOV A,@R1               ;YES. GET CCSW
            JB3 PRW                 ;WORK LIGHT SWITCH ACTIVE? YES

LGOF:       MOV A,@R1               ;NO. TURN OFF WORK LIGHT BIT.
            ANL A,#RBIT3            ; (SEE PRW:)
            MOV @R1,A               ;STORE CCSW
            CALL LGHTOF             ;TURN OFF LIGHT.
            JMP MBYE
```

```
PRW.    MOV A,R7            ;WRK LIGHT SWITCH IS ACTIVE.
        JB0 LGOF            ;IS LIGHT ON? YES
        CALL LGHTON         ;NO.  TURN IT ON
        JMP MBYE

;R1=TIMCC,R0=CCINP

CCHIGH: MOV A,@R0           ;GET CCINP
        ORL A,#(SBIT1+SBIT6) ;PUT LCCIH BIT ACTIVE&CMND
        XCH A,@R0           ;EITHER WAY CMND=1
        JB1 CHIGH           ;PREVIOUS CMND IN=LOW? NO
TIMCCD: MOV @R1,#247        ;RESTART COMMAND DEBOUNCE TIMER
        JMP MBYE            ;(DEBOUNCE FOR HIGH IS 100MSEC
                            ; SO AS NOT TO DISTURB THE TIMEOUTS
                            ; ON THE WRK,VAC AND U/D SWITCHES)
CHIGH:  MOV A,@R1           ;CMND DEBOUNCE TIMER TIME OUT?
        JNZ MBYE            ;---NO

MOV A,@R0           ;YES. PUT CMND,WRK,VAC,SACT FLAGS
        ANL A,#0D3H         ;IN CCINP IACTIVE. (CMND=1 ALREADY)
        MOV @R0,A           ;SAVE IT
        INC R0              ;PT TO CCSW
        JF0 IPRG            ;IN PROGRAM MODE? YES

CHIGHZ: MOV A,@R0           ;GET CCSW
        ANL A,#RBIT1        ;CCSW(CMND BIT)=0
        MOV @R0,A           ;STORE IT
        JMP MBYE
LBYEA.  JMP LBYE

;SUBL WILL SUBTRACT R2 FROM THE CLC.
;SUBLL WILL SUBTRACT R2 FROM WHEREVER R0 IS POINTING.
```

```
SUBL:   MOV R0,#CLC              ;CLC-R2=CLC
SUBLL:  MOV R1,#2                ;POINT TO R2

CLR A

MOV R3,A

CALL SUB                 ;(R0)-(R1)=(R0)

RET

; ADDL WILL ADD REGISTER 2 TO THE CLC.
; ADD WILL ADD REG 2 TO WHEREVER R0 IS POINTING.

ADDL:   MOV R0,#CLC
ADD:    CLR A                    ;CLEAR R2 AND
        XCH A,R2                 ;GET R2 CONTENTS
                                 ;ADD R2 TO CLC
        ADD A,@R0                ;RETURN WITH CARRY SET IF
        MOV @R0,A                ;LIMIT IS HIT.
        INC R0                   ;POINT TO MSB OF CLC
        CLR A
        ADDC A,@R0               ;ADD CARRY TO MSB
        MOV @R0,A
        RET

IFRG:   MOV A,@R0                ;GET CCSW
        ANL A,#(SBIT3+SBIT2)     ;SAVE WRK AND VAC BITS
        JZ CHIGHZ                ;EITHER BIT=1? NO
                                 ;YES. WHEN LETTING GO OF UP OR
                                 ;DWN SWICH IN PROG MODE THE
                                 ;MOTOR SHOULD SHUT OFF
        MOV A,@R0                ;GET CCSW AGAIN
        ANL A,#0F1H              ;CMD,VAC AND WRK BITS=0
        MOV @R0,A                ;SAVE IT
```

```
PSYS:   CALL SYSC               ;GO TO MBYE

PAGE

;RPM PERIOD MUST BE LESS THAN 12.5MSEC FOR THE
;RECEIVER PROGRAM TO WORK.

;ONLY DO LIMIT ROUTINE ON THE FALLING EDGE OF THE RPM (T1) INPUT.

MBYE.   CALL EDGE               ;CHECK FOR FALLING EDGE ON T1.

CLR A

MOV R0,#CTRPM           ;SEE IF ANY RISING EDGES HAVE

XCH A,@R0               ;COME IN ON T1. ALSO CLEAR CTRPM.

JZ LBYEA                ;EDGE COME IN? NO

MOV R2,A                ;SAVE CTRPM IN REGISTER 2

MOV R0,#TIM42           ;42SEC AND 10 SEC TIMER.

CALL TESTT              ;SEE IF IT IS ACTIVE.

JZ LBYE                 ;ACTIVE? NO. DON'T DO LIMIT ROUTINE

JF0 LPROG1              ;PROG MODE? YES

MOV R1,#FLAGS1          ;GET FLAGS1

MOV A,@R1

JB4 ADDUP               ;U/-D DOOR DIRECTION FLAG=UP? YES

CALL SUBL               ;NO. SUBTRACT CTRPM FROM CLC

JC LBYE                 ;HIT LIMIT? NO

MOV R1,#FLAGS1          ;YES. FLAG IT

MOV A,@R1

ANL A,#0FCH             ;DEACTIVATE BOTH LIMIT FLAGS

ORL A,#SBIT1            ;DOWN LIMIT FLAG

MOV @R1,A

MOV A,R7                ;TURN OFF OPEN DOOR INDICATOR
```

```
        ORL A,#SBIT3

MOV R7,A

OUTL BUS,A

MOV R3,#RBIT1      ;SEE SC: ROUTINE

JMP SC

ADDUP.  CALL ADDL          ;ADD CTRPM TO CLC

MOV A,@R0          ;R0 IS POINTING TO CLC+1

ADD A,#3           ;SEE IF COUNT IS BELOW DOWN LIMIT
                           ;LIMITS ARE FROM FD00 TO 08FF
                           ;FROM FD00 TO 0000 IS ABOUT 49"

JC LBYE            ;LOWER? YES

DEC R0             ;NO.  POINT TO CLC

MOV R1,#LIMITS

MOV A,@R0          ;CHECK IF OVER THE UP LIMIT YET

CPL A

ADD A,@R1          ;LIMITS-CLC

INC R0

INC R1

MOV A,@R0

CPL A

ADDC A,@R1

JC LBYE            ;AT UP LIMIT? NO

MOV R1,#FLAGS1     ;YES

MOV A,@R1

JB0 LBYE           ;ALREADY THERE? YES

ANL A,#RBIT1       ;NO

ORL A,#SBIT0       ;ACTIVATE THE UP LIMIT
```

```
        MOV @R1,A
        MOV R3,#RBIT3           ;DEACTIVATE THE PROGRAMMING FORCE UP

SC:     MOV A,R7                ;IF MOTOR IS OFF THEN DO NOT

ANL A,#(SBIT1+SBIT2)    ;GIVE A COMMAND
        JZ LBYE                 ;INACTIVE? YES. (COASTED PAST LIMIT!!)

MOV R0,#PDU             ;GET CONTENTS OF R3 AND TURN OFF
        MOV A,R3                ;THE PROPER FORCE FLAG
        ANL A,@R0               ;DONE THIS WAY SO FORCE IS NOT SHUT
        MOV @R0,A               ;OFF IF COASTING PAST LIMIT!!
SCREV:  CALL SYSC
        JMP LBYE

LPROG1: CALL FCMIN              ;ACTIVATE THE PROGRAM FORCE DOWN AND
                                ;UP FLAGS AND SET FORCES TO MIN

;PROGRAMMING UP LIMIT:

; MOVING UP: CTRPM+CLC-->CLC AND LIMITS
                                ;            COAST----CTRPM+CLC=CLC

; MOVING DWN. CLC-CTRPM--->CLC AND LIMITS
                                ;             COAST---SAME

;PROGRAMMING DOWN LIMIT:
                                ; 1. LIMITS-CLC=LIMITS
                                ; 2. CLC=0

; MOVING UP: LIMITS=LIMITS-CTRPM
                                ;            COAST--LIMITS=LIMITS-CTRPM
```

```
        ;   MOVING DWN: LIMITS=LIMITS+CTRPM
        ;              COAST--CLC=CLC-CTRPM

MOV R1,#FLAGS1
        MOV A,@R1
        JB5 LUP              ;PROGRAMMING THE UP LIMIT? YES
        MOV R0,#TWEAK        ;NO.  PROGRAMMING THE DOWN LIMIT.  INITIALIZE
        MOV @R0,#4           ;THE TWEAK LOCATION. START OFF BY NOT
                             ;LEARNING THE FORCE WITHIN 1/8" OF THE DOWN
                             ;LIMIT
        JB4 OCUP             ;GOING UP? YES

MOV A,R7             ;NO.
        ANL A,#006H
        JNZ OCUP             ;MOTOR ON? YES
        CALL SUBL            ;NO. CLC=CLC-CTRPM
        JMP CHLIM

OCUP.   MOV R0,#LIMITS       ;NO.
        MOV R1,#CLC
        CALL SUB             ;LIMIT-CLC=LIMIT
        MOV @R1,#0           ;CLEAR OUT CLC
        DEC R1
        MOV @R1,#0
        DEC R0               ;POINT TO LIMITS REGISTER
        MOV R1,#FLAGS1
        MOV A,@R1
        JB4 OPDIR            ;WHICH WAY IS THE DOOR GOING? UP

CALL ADD             ;LIMITS+CTRPM=LIMITS
```

```
            JMP CHLIM                  ;GO CHECK IF LIMITS ARE OK

OPDIR:  CALL SUBLL                     ;LIMITS-CTRPM=LIMITS
CHLIM:  MOV R1,#FLAGS1                 ;CHECK ON LIMITS ARE WITHIN A
        MOV R0,#LIMITS+1               ;REASONABLE RANGE.
        MOV A,@R0                      ;SET LIMITS UNKNOWN FLAG IF LIMITS ARE
        ADD A,#0F6H                    ;NOT WITHIN A RANGE OF 0 TO 8FFH
        JNC LFIN2                      ;LIMITS OK? YES
        MOV A,@R1                      ;NO.  SET LIMITS UNKNOWN FLAG
        ORL A,#SBIT7
        MOV @R1,A

DEC R0                         ;POINT TO LIMITS
        MOV A,@R0                      ;CLEAR LIMITS IF THEY ARE NOT WITHIN
        ADD A,#80                      ;THE RANGE OF FFB0 TO 8FF
        INC R0                         ;POINT TO LIMITS
        CLR A
        ADDC A,@R0
        JC LFIN                        ;WITHIN -80 TO 2303? YES
                                       ;DONE TO KEEP COAST WHEN PROGRAMMING
                                       ;THE LIMITS
        CALL CLRLIM                    ;NO. SET LIMITS UNKNOWN FLAG AND
        JMP LFIN                       ;UP LIMIT FLAG.

LUP.    JB4 LLUP                       ;PROGRAMMING UP LIMIT. DOOR MOVING UP? YES
        CALL SUBL                      ;NO. CLC-CTRPM=CLC
        JMP CTOL

LLUP:   CALL ADDL                      ;CLC+CTRPM=CLC
        MOV A,R7                       ;SEE IF MOTOR IS ON OR IS JUST COASTING
        ANL A,#006H
        JZ CHLIMA                      ;MOTOR ON? NO.
```

```
CTOL.   MOV R1,#LIMITS+1      ;PUT CLC INTO THE LIMITS REGISTERS
        MOV A,@R0             ;GET CLC+1
        MOV @R1,A             ;PUT IT INTO LIMITS+1
        DEC R1
        DEC R0
        MOV A,@R0             ;GET CLC
        MOV @R1,A             ;PUT IT INTO LIMITS
CHLIMA: JMP CHLIM

LFIN2:  MOV A,@R1             ;LIMITS ARE OK
        ANL A,#RBIT7          ;FLAG THAT LIMITS ARE KNOWN
        MOV @R1,A

LFIN:   CALL CALCU            ;CALCULATE NEW CHECKSUM AND STORE IT.

PAGE

LBYE:   CALL CHBL             ;POLL -INT PIN FOR CHECKING BLANK TIME

MOV R0,#TIM1          ;START THE RECEIVER HOUSEKEEPING PROGRAM
        MOV A,@R0             ;ONE SEC TIMER
        JNZ DBYEA             ;ACTIVE? YES

CHBITS: MOV R0,#FLAGS3        ;NO. GET FLAGS3
        MOV A,@R0
        ANL A,#0F9H           ;DEACTIVATE CERR AND CVALID FLAGS.
        XCH A,@R0
        INC R0                ;PT TO CODECT REG.
        JB1 COVAL             ;VALID CODE COME IN ON XMITTER? YES
        JB2 COERR             ;ERROR CODE COME IN ON XMITTER? YES
DBYEA:  JMP DBYE              ;NO
```

```
COERR:  MOV A,@R0          ;GET CODECT REG.
        ADD A,#010H        ;INCREMENT THE ERROR COUNTER
        MOV @R0,A          ;STORE IT
        ADD A,#0A0H        ;ERROR CT=6?
        JC ERV             ;HUH? YES-ERROR, VALID, RESET
        ANL A,#0F0H        ;ZERO LOWER NIBBLE.
        ADD A,#030H        ;ERROR COUNT+A+3=ERROR COUNT+9
        JNZ TCODEA         ;ERROR COUNTER=3? NO
        MOV A,@R0          ;GET CODECT AGAIN
        ADD A,#00CH        ;VALID COUNT+12
        MOV A,PSW          ;VALID COUNTER=4?
        JB6 DBYEA          ;CHECK AUX CARRY BIT. YES
ERV.    MOV R0,#CODECT     ;CLEAR VALID AND ERROR CODE
        MOV @R0,#0         ;COUNTERS
TCODEA. JMP TCODE

COVAL:  MOV A,@R0
        ANL A,#0FH         ;ZERO OUT ERROR COUNTER AND CHECK IF
        MOV @R0,A          ;VALID COUNT ALREADY
        XRL A,#004H
        JZ TCODEA          ;EQUAL 4? YES.
        INC @R0            ;NO. INCREMENT VALID CT
        MOV A,@R0
        XRL A,#004H        ;VALID CT NOW EQUAL 4?
        JNZ TCODEA         ; NO

CVALID. JF0 STDATA         ;YES. IN PROG MODE? YES
        MOV R0,#CCSW       ;NO.
        MOV A,@R0
```

```
        JB2 TCODEA              ;VACATION SWITCH ACTIVE? YES
                                ;DO NOT ACTUATE A SYSC FROM
                                ;TRANSMITTER.
        CALL SYSC               ;NO. ACTIVATE A COMMAND
        JMP TCODE               ;AUX1? NO OOPS BLEWIT

STDATA: MOV R1,#TRIDAT           ;PERMANENT LOCATIONS
        MOV R0,#TRIDT            ;TEMP LOCATIONS
        MOV R2,#3
MOVEA:  MOV A,@R0                ;TRANSFER JUST PROGRAMMED TRIDATA
        MOV @R1,A                ;TO PERMANENT LOCATIONS
        INC R0
        INC R1
        DJNZ R2,MOVEA            ;DONE? NOP
        CALL CALCU               ;STORE NEW CHECKSUM
        CALL INVLT
TCODE:  MOV R0,#TRC              ;START TIMER. IF NO CODES IN 300MSECS
        MOV @R0,#256-36          ;THEN RESET CODE VALID COUNTER AND
                                 ;ERROR COUNTER IN THE CODECT REGISTER

;PROGRAM SWITCH DEBOUNCE ROUTINE.
;USE KEYBOARD DEBOUNCE TIMER FOR THESE SWITCHES

DBYE:   MOV A,R7                 ;IF THE MOTOR IS ACTIVE THEN
        JB1 KEYSER               ;DO NOT DO SWITCH ROUTINE
        JB2 KEYSER               ;GOING DOWN? YES
        MOV R1,#SW               ;MOTOR IS OFF.
        IN A,P1
        XRL A,@R1                ;SEE IF SWITCH CHANGED STATE.
        ANL A,#SBIT3             ;PROG SWITCH ONLY
```

```
        MOV R2,A              ;STORE PROG SW CHANGE IN R2

IN A,P2               ;GET 1" SWITCH
        XRL A,@R1             ;SEE IF SWITCH CHANGED.
        ANL A,#SBIT7          ;IF 1" SWITCH ONLY
        ORL A,R2              ;GET PROG SWITCH

JZ KEYSER             ;EITHER SWITCH CHANGE STATE? NO
        XRL A,@R1             ;CHANGE THE SWITCH STATE REGISTER
        MOV @R1,A
        MOV R1,#SWDB          ;GET DEBOUNCE TIMER GOING
        MOV @R1,#256-4

IF KEYOPT                     ;SEE GDOSP.MAC

KEYSER: IN A,P1               ;GET KEY PORT INFO
        CPL A
        ANL A,#0F0H           ;MASK OFF LOW NIBBLE
        MOV R3,A              ;SAVE IT
        MOV R1,#KEYIN         ;PT TO KEYIN
        MOV R0,#TIMKEY
        XCH A,@R1
        XRL A,@R1             ;COMARE KEYIN TO KEYPORT
        MOV R1,#FLAGS2        ;PT TO FLAGS2
        JZ PROC               ;SAME? YES
        MOV A,@R1             ;NO. KPORT NOW IN KEYIN
        ANL A,#RBIT3          ;DEACTIVATE KEY PROCESSED
        MOV @R1,A             ;FLAG IN FLAGS2
        MOV @R0,#256-6        ;START DEBOUNCE TIMER (48MSEC)
                              ;NOTE THAT PROGRAM FROM HERE WILL(!)
                              ; GO TO KBYE!!
```

```
PROC.   MOV A,@R1              ;KEY ALREADY
        JB3 KBYE               ;PROCESSED? YES
        MOV A,@R0              ;NO.
        MOV R0,#KEYPT
        JNZ KBYE               ;KEY DEBOUNCED? NO

MOV A,@R1
        ORL A,#SBIT3           ;ACTIVATE THE KEYPROCESSED FLAG
        MOV @R1,A
        MOV A,R3               ;GET KEYIN
        JZ KBYE                ;KEY DOWN? NO
        MOV A,R7               ;YES
        ANL A,#(SBIT1+SBIT2)   ;GET BUS MOTOR UP&DOWN BITS
        JNZ KP3                ;ONLY. MOTOR ACTIVE? YES

;R0=KEYPT R1=FLAGS2
KCONT.  MOV A,@R1              ;5SEC TIMER ACTIVE?
        CPL A                  ;INVERT FLAGS2
        JB1 KBYE               ;YES

KC1.    INC @R0                ;INCREMENT KEYPT
        MOV A,@R0              ;GET KEYPT
        XRL A,#KEYS            ;KEYPT POINTING TO
        JNZ KP                 ;KEY1? NO
        MOV R1,#TKY+1          ;KEY TIMER (5 OR 10 SEC)
        MOV @R1,#0FBH          ;HIGH ORDER BYTE. (CT=1200)
                               ; START 10 SEC TIMER. FLAG IN
                               ; FLAGS2 ALREADY IS SET FOR 10 SEC.

KP.     MOV A,@R0              ;GET KEYPT
        MOV R1,A               ;POINT TO PROPER KEY
```

```
            MOV A,R3           ;GET KEY JUST INPUT
            JF0 KP1            ;IN PROG MODE? YES
            XRL A,@R1          ;COMPARE KEY AND KEYIN
            JNZ KRST           ;KEY=KEYIN? NO
            MOV A,@R0          ;GET
            XRL A,#KEYS+3      ;ALL FOUR KEYS IN?
            JNZ KBYE           ;   NO
KP3:        CALL SYSC          ;FROM KEYBOARD
            JMP KP2

KRST:       MOV R1,#TKY
            MOV @R1,#0C0H      ;LOAD KEY TIMER WITH 5 SECOND
            INC R1
            MOV @R1,#0FDH      ;UPPER BYTE
            MOV R1,#FLAGS2     ;LOCKOUT. ACTIVATE THE 5SEC FLAG
            MOV A,@R1
            ANL A,#RBIT1
            MOV @R1,A
            JMP KP2            ;PT TO KEY1

KP1:        MOV @R1,A          ;STORE KEY DEPRESSION
            CALL CALCU         ;CALCULATE NEW CHECKSUM
            MOV A,@R0          ;GET KEYPT
            XRL A,#KEYS+3
            JNZ KBYE           ;4 KEYS IN? NO
            CALL INVLT
KP2:        MOV @R0,#KEYS-1    ;KEYPT=KEYS LOCATION

ELSE

KEYSER:  NOP

ENDIF
```

;START AUXILLARY OBSTRUCTION ROUTINE

```
KBYE:   MOV R1,#TIMAUX

MOV R0,#FLAGS1

MOV A,@R0

JB3 OBS1            ;ACTIVE? YES

IN A,P2             ;NO INPUT OBS

JB6 OBS2            ;INPUT LOW? NO

OBS3.   MOV @R1,#0          ;YES OBS DEBOUNCE TIMER

STR:    JT0 APF1            ;ADVANCED POWER FAIL ACTIVE? YES

JMP START           ;NO

MOVEA.  JMP MOVE

OBS1.   IN A,P2             ;INPUT OBS

JB6 OBS3            ;OBS INPUT HIGH? (ACTIVE?) YES

OBS2.   MOV A,@R1           ;NO. OBS DEBOUNCE TIMER

JNZ STR             ;ACTIVE? YES

MOV @R1,#254

JMP STR

INVLT.  MOV A,R7            ;ACKNOWLEDGE STORING THE TRANSMITTER

JB0 L0              ;CODE BY FLIPPING THE GDO LIGHT.

CALL LGHTON         ;LIGHT WAS OFF, TURN IT ON

RET

L0:     CALL LGHTOF         ;LIGHT WAS ON, TURN IT OFF

RET                 ;LIGHTS.

APF1:   MOV R2,#5           ;DEBOUNCE APF!!

APFA:   JNT0 STR            ; APPROXIMATELY 60USEC

DJNZ R2,APFA        ;DEBOUNCED YET? NO
```

```
RESET:  DIS I                   ;WHAT ABOUT AN INTERRUPT ABOVE?

STOP TCNT

DIS TCNTI

MOV A,#050H             ;WE GOT AN APF! KEEP D6 AND D4
        OUTL BUS,A              ;HIGH

MOV R1,#FLAGS1          ;SHUT OFF EVERYTHING

MOV A,@R0               ;AND PUT FLAGS1 INTO SFLAG1

MOV R0,#SFLAG1          ;EAROM STORAGE

MOV @R0,A

MOV R0,#SCCSW           ;STORE CCSW INTO SCCSW

MOV R1,#CCSW

MOV A,@R1

MOV @R0,A

CALL CALCS              ;NEW CHECKSUM SINCE CCSW IS BEING STORED

MOV @R1,A

MOV A,#RCL              ;MAKE SURE THAT PREVIOUS RECALL LATCH

CALL WRINST             ;IN EEROM IS SET.

CALL WRENB              ;ENABLE WRITE TO EAROM

MOV R0,#EACT            ;STORE CLC COUNT,FLAGS1, CHECKSUM AND

MOV @R0,#256-9          ;SCCSW

DEC R0

MOV @R0,#TWEAK+1+2

DEC R0

MOV @R0,#WRTS           ;WRITE EAROM,START AT ADDR 8

CALL IWRITE             ;WRITE 9 REGISTERS TO EEROM

MOV A,#STO              ;STORE THE DATA

CALL WRINST             ;AFTER A STORE OPERATION THE WRITE
                                ;LATCH IN THE EEROM IS DISABLED.
```

```
        MOV A,#256-110        ;DELAY FOR 10MSEC BEFORE RESETTING

MOV T,A               ;IF A POWER UP OCCURS BEFORE THE STORE

STRT T                ;OPERATION IS DONE THEN THE EEROM

RETIM:  MOV A,T               ;CAN NOT BE READ. MAKE SURE THAT THE

JNZ RETIM             ;EEROM IS DONE BEFORE RESETTING THE

;MICROPROCESSOR. 110*96USEC=10MSEC.

MOV A,#010H           ;ALL DONE. RESET THE 8049.

OUTL BUS,A

HERE.   JMP HERE              ;WAIT FOR HARDWARE TO RESET ITSELF.

;"START" IS THE LOOP BACK POINT IN THE "INIT" ROUTINE.
```

I claim as my invention:

1. A garage door operator for a garage door comprising, a motor with an output shaft connected to said garage door to open and close it, a control unit with an energize switch and up and down setting switches, a microprocessor connected to said control unit and to said motor to energize it, a program switch settable to operate and program positions and connected to said microprocessor, a rotation detector mounted so as to monitor rotation and direction of rotation of the output shaft of said motor, and said rotation detector connected to supply an input to said microprocessor when said program switch is in the program position, and the motor will move in the down direction when said down setting switch is energized and the motor will move in the up direction when said up setting switch is energized and down and up limits will be set when the door has been moved, and means for automatically setting the force limits connected to said microprocessor to set the force limits when the garage door is initially operated, wherein a radio receiver is connected to said microprocessor and a radio transmitter is capable of transmitting a signal to energize said radio receiver to operate said door, including a door condition indicator connected to said microprocessor and energized when a problem exists with the door and the garage door operation, wherein said radio transmitter when energized radiates a coded signal and said radio receiver receives and detects said coded signal, means for storing a stored coded signal at said receiver, said microprocessor receiving and comparing said coded signal with said stored coded signal, and said microprocessor producing a garage door operator signal if said transmitted coded signal and said stored coded signal are the same, wherein said means for storing is a memory means into which the coded signal from the transmitter can be supplied so as to change the stored coded signal in said means for storing, wherein said means for storing is a multicontact switch which can be manually set, wherein said door condition indicator produces an intermittent output when there is a fault in the garage door operator and said indicator produces a continuous output when the mechanical condition of the door is improper, and including a one inch obstruction switch connected to said microprocessor to set a one inch reversal limit.

2. A garage door operator according to claim 1, including a security switch connected to said microprocessor and provided with a plurality of operating contacts which when actuated in a predetermined sequence energize the microprocessor so that it operates said door.

* * * * *